United States Patent
Morgenstern

(10) Patent No.: US 8,365,164 B1
(45) Date of Patent: Jan. 29, 2013

(54) PORTABLE SOFTWARE APPLICATIONS

(75) Inventor: Roman Morgenstern, Rechovot (IL)

(73) Assignee: T-APP Ltd., Sde Boker (IL)

( * ) Notice: Subject to any disclaimer, the term of this patent is extended or adjusted under 35 U.S.C. 154(b) by 972 days.

(21) Appl. No.: 12/388,636

(22) Filed: Feb. 19, 2009

Related U.S. Application Data

(60) Provisional application No. 61/064,205, filed on Feb. 21, 2008.

(51) Int. Cl.
*G06F 9/44* (2006.01)
*G06F 9/445* (2006.01)
(52) U.S. Cl. ......... 717/175; 717/108; 717/116; 717/120
(58) Field of Classification Search ......................... None
See application file for complete search history.

(56) References Cited

U.S. PATENT DOCUMENTS 8,037,471 B2 * 10/2011 Keller et al. .................. 717/174

* cited by examiner

*Primary Examiner* — Chuck Kendall

(57) ABSTRACT

A method of mapping a software installation, including:
(a) providing a software installed on a computer with an operating system and at least one storage device, the installation including a plurality of software components and at least one entry in a system record on the storage device;
(b) providing a plurality of potential interaction points between said installation and said computer;
(c) executing at least one informer on said computer to obtain information about said potential interaction points of said installation with said operating system; and
(d) determining a plurality of relationships between said components based on said interaction points on which information was obtained.

17 Claims, 7 Drawing Sheets

PORTABLE SOFTWARE APPLICATIONS

RELATED APPLICATION

This Application claims the benefit of U.S. Provisional Patent Application No. 61/064,205 filed on Feb. 21, 2008, the disclosure of which is incorporated herein by reference.

FIELD OF THE INVENTION

The present invention relates, in some embodiments thereof, to portability, extendibility and/or configurability of software, for example, fast installation of software.

BACKGROUND OF THE INVENTION

Personal computers have become an important part of people's lives. Users typically personalize their usage of the computer by installing complex software and by personalizing various setting on these computers. Installation is sometimes a relatively complex process, which may take tens of minutes for complex software. In addition, a user is often required to provide answers to various questions and have system privileges which allow installation. After installation is completed, a user often expends a large effort in selecting personalization settings desirable to him/her. Furthermore, a user may be required to restart his computer.

A typical software installation and removal process includes the following steps. Many software programs are never uninstalled, though this option typically remains:

(a) Compatibility test. Making sure that the target system (hardware and/or software) is compatible with the software to be installed. In some cases, a backup of system configuration and/or data is performed at this step.

(b) Copying files to the target system.

(c) Subscription. Various shared system tables and directories are updated with the installation and application information.

(d) Configuration. The installed software is configured for the target system, for example, based on user preferences, file locations and security settings.

(e) Customization. Various user preferences are set, sometime using queries to the user, sometimes by copying existing settings on the target computer.

(f) Clean-up. Residues of the installation process are removed. In some cases, restarting the target computer is required to complete installation. Typically, an uninstall instruction file is created and saved.

In a typical installation, some or all of the following fifteen component types are provided:

(1) Exe files
(2) Data files
(3) Configuration Files
(4) Application Folders
(5) Dynamic Dll file
(6) Desktop Settings
(7) Registry Keys
(8) File Extensions (definitions)
(9) Code Libraries
(10) Environment Variables
(11) Services
(12) Application Shares
(13) Integration with OS
(14) Drivers Of these items, the last eight include integration/registration/changing the OS.

However, once a user walks away from the personal computer, that user also walks away from all the past effort. Several solutions have been suggested to allow a person to port his effort. A straight forward solution is using a portable computer. However, even such computers may have a significant weight and/or otherwise be inconvenient.

U.S. Pat. No. 6,405,362 to Shih et al., issued on Jun. 11, 2002, the disclosure of which is incorporated herein by reference, describes an operating system of a computer, which automatically installs a program from a removable memory unit responsive to detecting connection of the removable memory unit to the computer and uninstalls the program when the removable memory unit is disconnected from the computer.

In one embodiment, the Shih patent suggests performing a complete installation of the program, each time the removable memory unit is connected to the computer. Such a procedure, however, is time consuming, especially when a plurality of programs need to be installed.

In another embodiment, the Shih patent suggests running the program from the removable memory unit without installation. This solution is suggested also by US Patent Application Publication No. 200310212862 to James, published on Nov. 13, 2003, the disclosure of which is incorporated herein by reference. Running programs without installation, however, has many drawbacks.

Another solution is to prepare memory images of the program in an installed format and to copy them byte by byte into the computer memory. Upon completion of the copying, the computer is rebooted to allow use of the program. This solution is described, for example, in U.S. Pat. No. 5,604,906, to Murphy et al., U.S. Pat. No. 5,953,533 to Fink et al., US Patent Application Publication No. 2002/0108033 to Kroening, PCT Publication No. WO 01/73543 to Raymond et al., and U.S. Pat. No. 6,080,207 to Kroening et al., the disclosures of all of which documents are incorporated herein by reference.

US Patent Application Publication No. 2004/0095382 to Fisher et al., published on May 20, 2004, the disclosure of which is incorporated herein by reference, describes a portable memory carrying an operating system which is used to boot a host computer.

US Patent Application Publication No. 2005/0240918 to Shlomai, published on Oct. 27, 2005 and U.S. Pat. No. 5,642,417 to Stringer, issued on Jun. 24, 1997, the disclosures of which are incorporated herein by reference, describe a method of generating a virtual registry which is stored with an application program on a portable memory. In operation, an API of the application is mapped to the virtual registry and thus circumvents the operating system (OS) of a computer on which the application is run. This method is problematic due it being classified as a security hazard and hence being blocked by firewalls and safe OS.

Another solution is found in products such as the MIGO (www.migosoftware.com) which copy and synchronize information between a computer and a portable storage device. However, not all personalization information and application can be synchronized in this manner. Further, if the computer to which the user moved lacks an application, the MIGO and its like do not provide this application. Another solution is to provide a portable device that also includes a CPU, however, this solution is typically CPU and/or memory limited.

A MojoPack (www.mojopac.com) is subset of OS layers which are sufficient to create independent virtual environment for installation and launching of some software applications. The virtual environment redirects application files and system registry entries to a USB memory drive using file and registry system drivers.

Ceedo (www.ceedo.com) uses application file and system registry virtualization. A VM (virtual machine) redirects system calls of applications by technique known as "windows API hooking" to data sources and a file system on a USB memory drive.

U.S. Pat. No. 6,263,363 to Rosenblatt et al., the disclosure of which is incorporated herein by reference, modifies the registry for customizing a computer to an environment stored on the Internet.

US Patent Application Publication No. 2004/0001088, the disclosure of which is incorporated herein by reference, describes a portable key device used to transport a computing environment from one computer to another.

Korean Patent Application Publication No. 2003-0032656, the disclosure of which is incorporated herein by reference, describes an automatic software installation method using an event file which records a process of installation at a first computer and then executes the process on a second computer using the event file.

Japan Patent Application Publication No. 10-198569, the disclosure of which is incorporated herein by reference, describes an installation process using remote control.

US Patent Application Publication No. 2007/011672, the disclosure of which is incorporated herein by reference teaches how a software application can be installed under one operating system, and accessed for execution by a second operating system compatible with the first operating system by identifying and making appropriate changes to system parameters in the second operating system US Patent Application Publication No. 2006/0168564, the disclosure of which is incorporated herein by reference, describes a method and apparatus for automating the installation of a plurality of operating system and device management software combinations, with their respective and related configuration data, onto a plurality of information management system platform hardware including having all related details of the integration, installation and validation processes be automatically recorded and stored in a manner conducive to future retrieval, review, analysis, modification, and possible re-use, using a chained integration process (CIP), which treats a combination of information handling system hardware and a software delivery stack, including BIOS, device drivers, firmware, and other software components, as input.

SUMMARY OF THE INVENTION

A broad aspect of some embodiments of the invention relates to forming a map of an installation and/or manipulating software installations and packages using a map of the installation. Such manipulation can include, for example, one or more of modifying an existing installation, fast installing and uninstalling and management and maintenance of installations. It is a particular feature of some embodiments of the invention that a software installation, which is a complex entity when in package form and strongly integrated into an operating system when installed, can be manipulated in a convenient manner.

While many examples are shown for a PC computer, for example, one executing Windows or Linux or Unix type operating systems, Optionally, other devices with operating systems are supported, for example, cellular telephones and embedded devices. Typically, the most complex installations are found on personal computers, which suffer from a combination of many installed applications, lack of organized system management and a wide range of modifications to hardware and software by users and applications.

It is a particular feature of some embodiments of the invention, that the map is formed by examining interaction points, where an installation interacts with an existing system (e.g., hardware, software, operating system and/or other computers), thereby identifying an interface between an installation and the existing system. In some embodiments, the installation is separated at that interface. Exemplary interaction points, some or all of which may be utilized by exemplary embodiments of the invention occur at: system registry, system and other application logs, file system locations, system and/or installed applications' configuration files.

It is a particular feature of some embodiments of the invention, that the map is formed by examining locations, such as one, two, three or more of the following that are not used for such purpose: MSI cache and records; Unistall information; inside (e.g., cache) of an installation package (e.g., NSIS, MSI, InstallShield); Environment Variables; Com objects Data Base; ODBC; and/or objects Data Base.

Examples of potential interaction points (where there may be interaction and are thus optionally examined) include one or more of API accessible points, for example, API for resource management and/or monitoring, feature sets, registry, file system, environment variables and/or other documented OS services that applications use and/or record information in, for example, start menu, add/remove programs and startup shortcuts, MRU registry settings, MSI internal databases and/or prefetch files lists.

It is a particular feature of some embodiments of the invention that an installation is mapped at a level of element, which is the smallest item directly accessible by the operating system, and that larger aggregations, such as components and features are also treated as units. In some cases, the use of smaller parts allows an installation to be better defined and/or manipulated. In some cases, a hierarchical structure is used up to the level of applications or application sets.

In an exemplary embodiment of the invention, an element includes one or more of a registry entry, a file, an executable, setting and/or other structured data available for direct access using Application(OS) API.

In an exemplary embodiment of the invention, the following criteria are used to define an element:
  (a) The object in question is the smallest part of the application. It can not be divided into child objects that may have some logical meaning; and/or
  (b) The operating system API and/or application API (e.g., including MSOffice API for plug-ins) contains a well defined functional scope to work with it, so the element corresponds to an appropriate base OS (or other installed application) component.

As used below, a component groups elements together by some criterion (e.g., type, purpose, cross references between elements, versioning, localization, speeding installation). In some cases these groups may be registered or recorded at once by one step of installation procedure using an API.

As used below, features are well described collections of software components (and/or elements) that perform a particular function or role within a software product. Features allow software products or applications to be decomposed into units that have a meaning to users rather than units that reflect how the product or application was built.

It is a particular feature of some embodiments of the invention, that the map is generated in an iterative manner, whereby detection of some components and/or interaction points leads to the search and identification of additional interaction points.

It is a particular feature of some embodiments of the invention, that the map is generated using inference methods (e.g., logic, rules, probability, heuristics, confidence levels), in addition to straight data collection.

It is a particular feature of some embodiments of the invention, that copying is replaced by adding links to a storage location.

In an exemplary embodiment of the invention, folders which are used for program components are linked, using a soft link or a hard link to the host operating system. Optionally, this allows a plurality of components to be correctly located, without copying. Optionally or alternatively, this allows any files that change, to change on a portable memory device, rather than a host and not require copy for synchronization. In one example, software components are placed in sub-folders which are linked to a "program files" directory of windows (e.g., as used herein, Windows XP, Windows 2003, Windows Vista, Windows CE, and/or various versions or upgrades thereof and/or future windows operating systems). In another example, single files are mounted (linked) in this manner.

Optionally or alternatively, such mounting by linking is used for other reasons, for example, conflict resolution. Optionally, an existing application has its directories renamed, so as not to conflict with a newer version of the application, which may be mounted with the same name.

Optionally or alternatively, one or more registry entries are modified by linking them to a different location, for example, on a portable memory device. Optionally or alternatively, environmental components are so modified, for example, a path variable such as "PATH" modified to link to a portable or network location.

It is a particular feature of some embodiments of the invention that software is provided on a host system by linking to and/or mounting of a portable or network storage, instead of installing thereon with copying.

It is a particular feature of some embodiments of the invention, that an installation is enhanced be adding elements to it, for example, to assist in isolation, compatibility and/or to add features.

It is a particular feature of some embodiments of the invention, that an installation is personalized, for example, based on user needs or settings.

In an exemplary embodiment of the invention, a map of an installation includes some or all of the following: elements, components, features, relationships, conditions, dependences, add-ons, installation work flow for each application part and/or additional information about Application such as language, version, vendor and/or OS compatibility.

In an exemplary embodiment of the invention, a map includes at least a list of components or elements and their relationships, e.g., relative placement, location, hierarchy, existence, coexistence, executive dependences, belonging to named subsets (e.g., features and products), sharing and/or version (optionally including newer, older, . . . ).

In an exemplary embodiment of the invention, the time spent resolving components, features, elements, building associations, repackaging and/or new installation is less than it takes to install and configure an application. In an exemplary embodiment of the invention, various algorithms, strategies and/or heuristics are used to reduce the time it takes to search a computer for all installed components. Optionally or alternatively, using an association approach as described herein, mostly relevant data is indexed with little garbage. In an exemplary embodiment of the invention, the time of generating a map is on the order of an installation time.

In an exemplary embodiment of the invention, time later spend in configuring is avoided, as the configuration is also installed. Additional savings may be realized due to commonality between applications.

An aspect of some embodiments of the invention relates to an informer software tool adapted to determine the internal structure of a software application, including the components of the application, the associations between the components and/or conditions of use of the components (a map). In an exemplary embodiment of the invention, the informer tool includes a plurality of informers, each informer providing information about a different aspect of a software installation.

In exemplary embodiments of the invention, installation of a software application is the act and the effect of putting the program in a computer system so that it can be executed. Non Trivial Installation is an installation that requires creation or modification of (copy of) at least 1 component in file system and at least 1 permanent record in system registry, or in applications settings or configuration files of installed application (e.g., for installation of add-ons). More complex installation may include, 2, 3, 4, or more components in 2, 3, 4, or more different types of locations in a computer.

In exemplary embodiments of the invention, deinstallation of an application is terminating an ability of the application to run on the computer. Usually deinstallation will clean non-shared program components and permanent registry records from computer. If installation is not trivial it will require deinstallation which is not mere file removing.

An operating system (OS) is a basic software component of a computer system (usually a plurality of programs and system table (or information) that is responsible for the management and coordination of activities and the sharing of the resources (hardware and software) of the computer and interfacing between applications and hardware. Some operating systems provide various services, lie file management and virtual memory. Typically, a part of the file system of the computer is dedicated for operating system use. Typically an operating system is in layers, where lower layers are more capable of interacting and require more careful matching up. In an installation process, integration of the installation is with various levels of the OS, the lower the level, more generally, the more complex the installation.

In an exemplary embodiment of the invention, the following levels of software in a computer are distinguished:

(a) (lowest) Driver level, including hardware drivers and intermediate drivers; software installed on this level may interact with hardware and software on a computer;

(b) (middle) Service level—service providers, ODBC drivers, interposes communications, network; Software installed on this level may interact with almost all software on a computer; and (c) (high) Application level—business applications, user applications; Software installed on this level may interact with services of the computer.

In an exemplary embodiment of the invention, the informer tool determines the internal structure of the software application by analyzing an installed application on a computer.

Optionally, the informer software tool is also adapted to determine specific user selections of the software application, when the analysis is performed on an already installed software application.

In some embodiments of the invention, the informer software tool is used in fixing software problems, for example identifying missing modules or other software components and providing such modules, for example in an installation or in a software package. In another example, missing connections are detected and repaired.

In an exemplary embodiment of the invention, the fixing is performed without recording an installation during an installation process.

In an exemplary embodiment of the invention, the informer is used to isolate an installation, for example, moving it from one location to another.

In an exemplary embodiment of the invention, a software installation is moved, only in part, for example, only one or two out of a set of applications in a software suite are moved and/or used to generate an installation package.

An aspect of some embodiments of the invention relates to an informer tool adapted to generate an application package, optionally based on an existing installation and a cached version of the installation process. In an exemplary embodiment of the invention, the package is generated from an analysis of a static state of a memory, for example a state of a computer memory on which the application is installed or an old application package of the application from which the application is installed on computers. Possibly, the old application package used by the informer tool does not have installation tables or scripts and/or is not predefined for modification, for example, the package analyzed is not MSI or NSIS compliant. Typically, an MSI compliant package is created using MSI technology and MSI tools and an NSIS complaint package is created with help of NSIS tools. MSI is an example of a CIM compliant methodology.

In general, an informer is a software agent that is able to provide information about application, application elements, components, relationship, features, installation work flow conditions for installation, application updates and transformations, user application customizations and configurations and/or used installation engine by observing interaction points.

In an exemplary embodiment of the invention, informers are distinguished by the type of interaction points they are able to observe and/or what information about the application they can provide.

In an exemplary embodiment of the invention, informers are distinguished by their complexity, with some informers looking up information and other informers analyzing extracted data to provide information. Some informers use data from other informers for such analysis. In an exemplary embodiment of the invention, one type of informer looks at a footprint of an application which is all the executable components of the applications that can be loaded to RAM or all readable components of an application.

Optionally, the generated software application package is user customized, for example, based on selections of a user as appearing in the software already installed on a computer or using a setting policy. Optionally, the setting policy is applied by copying settings (e.g., elements and/or components) from a default user profile to a plurality of computers.

In other embodiments of the invention, the informer tool is adapted to generate an application package which includes in it specific user settings as appear on a specific computer.

In an exemplary embodiment of the invention, the package is generated after analyzing a cached version of the installation. Optionally, the analysis is supported by comparison to the actually installed software. For example, a cache can include a variable, while the value of the variable can be seen from the actual installation. Optionally or alternatively, the cache shows the workflow of installation. Optionally or alternatively, the cache can show where components may be found. The term "cache" is used to include "uninstall" information.

In some embodiments, the modification is by adding one or more scripts.

In some embodiments, the package comprises a set of applications.

In an exemplary embodiment of the invention, the modification comprises making the package more portable.

In an exemplary embodiment of the invention, the modification comprises making the package MSI and/or otherwise CIM compatible.

In an exemplary embodiment of the invention, the modification comprises adding missing software components, such as software, registry entries and/or language support.

In an exemplary embodiment of the invention, a registry is a (one or more) operating system database of records, often in the form of a tag associated with a value. Different operating systems with a registry function implement the registry differently.

For example, under Unix and Linux, system-wide configuration files (generally equivalent to HKLM on Windows) are stored in files in /etc/ and its subdirectories, or sometimes in /usr/local/etc.

Per-user information (generally equivalent to HKCU on Windows) is stored in hidden directories and files within the user's home directory.

Applications running on Apple Inc.'s Mac OS X operating system typically store settings in property list files which are usually stored in each user's Library folder. Mac OS X also has a system database called NetInfo that stores system-wide settings such as user account details and network configuration.

IBM AIX (a Unix derivative) uses a registry component called Object Data Manager (ODM) The ODM is used to store information about system and device configuration. The ODM stores its information in several files, default location is /etc/objrepos.

In an exemplary embodiment of the invention, the modification comprises generating a package which will install only part of an installation, for example, only one application from a set of applications and/or a reduced feature version.

In an exemplary embodiment of the invention, the modification comprises changing a target system configuration, for example, a target operating system and/or pre-requisites.

An aspect of some embodiments of the invention relates to an installation monitoring tool adapted to monitor changes in installation of a software application after the initial installation of the software was completed. Optionally, the installation monitoring tool monitors changes in the installation of an installed software application, during the run time of the application.

In an exemplary embodiment of the invention, a change in installation is determined by comparing a system set up before and after a system restore point is saved.

In an exemplary embodiment of the invention, damage to an installation is automatically repaired. Optionally, the monitoring tool is a part of an operating system. Alternatively or additionally, it is part of an installed software. Alternatively or additionally, it is a stand alone program.

An aspect of some embodiments of the invention relates to re-arranging software components in an installation. In an exemplary embodiment of the invention, features and/or options are aggregated from software components, for example, according to user request or according to connection between the components In an exemplary embodiment of the invention, component aggregation is used in one or more of version control, installation repair, option addition and/or removal, user option settings and definitions and/or software repair.

An aspect of some embodiments of the invention relates to an application package for installation of a software that includes an installation management software configured to perform both read and write operations on the application package during installation. Optionally, in addition to reading from the application package in order to perform the installation on a host computer, the installation management software writes into the application package parameters of the actual installation, such as user selections, actual file and registry hierarchy, language and/or plug-in identification. In some embodiments of the invention, each registry change performed in the computer during the installation is recorded in a table in the application package by the installation software.

Optionally, further installations based on the application package use the written parameters, in order to achieve a faster installation.

In some embodiments of the invention, the application package is stored on a portable read/write memory unit, such as a flash memory device. In other embodiments of the invention, the application package is supplied in other forms, for example over the Internet.

An aspect of some embodiments of the invention relates to a portable storage device including thereon a self-installing and uninstalling set of software components.

In an exemplary embodiment of the invention, the device links a target system to the device, rather than copying, to effect an installation.

In an exemplary embodiment of the invention, the device detects and manages software installation conflicts, for example, by temporarily overriding an existing installation.

An aspect of some embodiments of the invention relates to a server-client architecture using a server to manage installed software components on a plurality of machines, in which at least a plurality of software configuration are provided and/or software which is not designed for central management is used. For example, software not compliant with the DMTF (www.dmtf.org) standard for application management.

In an exemplary embodiment of the invention, the installation on each computer is mapped as described herein. Optionally, the management includes user settings. Optionally or alternatively, the management includes adding and removing features and/or version control.

There is provided in accordance with an exemplary embodiment of the invention, a method of mapping a software installation, comprising:

(a) providing a software installed on a computer with an operating system and at least one storage device, the installation including a plurality of software components and at least one entry in a system record on the storage device;

(b) providing a plurality of potential interaction points between said installation and said computer;

(c) executing at least one informer on said computer to obtain information about said potential interaction points of said installation with said operating system; and (d) determining a plurality of relationships between said components based on said interaction points on which information was obtained.

In an exemplary embodiment of the invention, the method comprises identifying at least one additional interaction point based on said determining.

In an exemplary embodiment of the invention, said informer non-trivially analyzes data to provide said information.

In an exemplary embodiment of the invention, said record includes one or more of:
 i) a system registry;
 ii) an application set up file of an application other than said software;
 iii) a system set up file; and
 iv) information retrievable using a system API.

In an exemplary embodiment of the invention, said components are installed in a plurality of directories of said storage device. Optionally, at least one of said directories is a system directory. Optionally or alternatively, at least one of said directories is a system directory and at least one of said directories is a non-system directory.

In an exemplary embodiment of the invention, providing a plurality of interaction points comprises determining which of a plurality of potential interaction points are used. Optionally, said plurality of potential interaction points include at least one interaction point required by the operating system. Optionally or alternatively, said plurality of potential interaction points include at least one interaction point required by the software. Optionally or alternatively, said plurality of potential interaction points include at least one interaction point from a list of commonly used interaction points.

In an exemplary embodiment of the invention, said plurality of potential interaction points include at least one interaction point from a list of previously provided interaction points for the software.

In an exemplary embodiment of the invention, at least some of said plurality of potential interaction points are identified by analyzing one or more of an operating system cache, a trace, a log, and known application components.

In an exemplary embodiment of the invention said at least one informer is selected from a group consisting of:
 (i) a file system informer which finds files that are at least one of affected by and used by the software;
 (ii) a registry informer which finds at least one of registry entries and registry values that are at least one of affected by and used by the software;
 (iii) a corn object informer which finds and reconstructs objects that are of type corn and which are at least one of affected by and used by the application;
 (iv) a CIM informer which retrieves CIM information;
 (v) an wmi informer which retrieves WMS information;
 (vi) an uninstall informer which retrieves uninstall information from locations where such data is stored;
 (vii) a system environment informer, which reports a system environment;
 (viii) a product informer, which identifies one or more of the software, system cache belonged to the software, main directories, vendor, version and language;
 (ix) a feature informer, which identifies which features of the software were installed;
 (x) a component informer, which identifies which components of the software were installed;
 (xi) a plug-in/add-on informer which identifies software packages with which the software could act as a plug-in or add-on;
 (xii) an install list informer, which identifies which software is installed on the computer;
 (xiii) a settings informer, which identifies system settings of the software; and
 (xiv) a calling dependency informer, which identifies which components call which other components of said installed software;

In an exemplary embodiment of the invention said at least one informer includes: at least one application property informer, at least one element informer, at least one component informer, at least one feature informer and at product informer.

In an exemplary embodiment of the invention said at least one informer comprises at least 4 informers from said group.

In an exemplary embodiment of the invention, said at least one informer includes at least a system cache informer, a system trace informer, a file system informer, a system databases and environment informer for registry, CIM and environment variables, a registering components informer for system-registered objects, an application cache informer for uninstall information and an application component informer for components features and products.

In an exemplary embodiment of the invention, determining a plurality of relationships comprises analyzing at least one value in a registry to determine a reference to another component or element.

In an exemplary embodiment of the invention, determining a plurality of relationships comprises analyzing linkage by procedure calling between software components.

In an exemplary embodiment of the invention, determining a plurality of relationships comprises comparing said record to an actual existence of a software component indicated in the record.

In an exemplary embodiment of the invention, the method comprises identifying and analyzing at least one footprint of said installation on said computer.

In an exemplary embodiment of the invention, the method comprises identifying and analyzing at least one string of text or binary in at least one of said components.

In an exemplary embodiment of the invention, the method comprises aggregating a plurality of software components into a meta-component providing a functional feature, and recording said aggregated meta-component.

In an exemplary embodiment of the invention, the method comprises managing at least one element.

In an exemplary embodiment of the invention, the method comprises aggregating a plurality of software components into a meta-component providing a plurality of related features, and recording said aggregated meta-component.

In an exemplary embodiment of the invention, the method comprises manually naming said meta-component.

In an exemplary embodiment of the invention, the method comprises automatically naming said meta-component as a feature with a human understandable name.

In an exemplary embodiment of the invention, the method comprises filtering out one or more components to not be mapped.

In an exemplary embodiment of the invention, said filtering comprises filtering based on one or more of location of the component in a registry, location of the component in an operating system, location of a component in a storage device and a pre-determined list of components.

In an exemplary embodiment of the invention, the method comprises identifying interaction points based on (c) and (d) and repeating (c)-(d) based on said identified points.

In an exemplary embodiment of the invention, the method comprises profiling said software prior to said installing to determine at least part of said plurality of potential interaction points.

In an exemplary embodiment of the invention, said profiling comprises analyzing a specific installation different from the instant installation.

In an exemplary embodiment of the invention providing a software comprises identifying all software installed on said computer and selecting a particular software of said identified softwares based on one or both of user input and a policy.

In an exemplary embodiment of the invention, the method comprises at least partially executing said software to identify at least some of said potential points.

In an exemplary embodiment of the invention at least partially executing comprises loading at least one DLL library.

In an exemplary embodiment of the invention said installation file is configured for fast installation.

In an exemplary embodiment of the invention said fast installation includes aggregating a plurality of components into a meta component which is linkable to, to effectively install the plurality of component in a single step.

In an exemplary embodiment of the invention said installation file is configured for regular installation, where each component is installed according to its type.

In an exemplary embodiment of the invention said different installation is of a different software.

In an exemplary embodiment of the invention, the method comprises modifying said installation using said map.

In an exemplary embodiment of the invention modifying comprises one or more of modifying one or more settings, modifying an owner, adding or removing one or more features, adding or removing one or more component, making the installation CIM compliant and isolation of the software installation.

In an exemplary embodiment of the invention modifying said package comprises one or more of adding to said package, removing from said package and transforming said package.

In an exemplary embodiment of the invention said change comprises an added operating system component.

In an exemplary embodiment of the invention said component is a user profile.

In an exemplary embodiment of the invention said change comprises removing at least one feature form said package.

In an exemplary embodiment of the invention said change comprises making said package specific for a target configuration including one or more of a specific operating system, specific hardware and specific set of software that is to be used with the package.

In an exemplary embodiment of the invention, the method comprises providing a company policy applicable to a plurality of software packages and wherein said change comprises applying the company policy to the software.

In an exemplary embodiment of the invention said change comprises making the installation package CIM compliant.

In an exemplary embodiment of the invention said change comprises one or both of adding and changing uninstall information.

In an exemplary embodiment of the invention said change comprises modifying at least one user interaction dialog.

In an exemplary embodiment of the invention said change comprises changing one or more of a product identification of the software, a name of the software and aversion of the software.

In an exemplary embodiment of the invention said change comprises aggregating a plurality of components into a feature.

In an exemplary embodiment of the invention said filtering comprises interfacing with one or more scripts of said package during execution thereof and modifying behavior of said script.

In an exemplary embodiment of the invention modifying a behavior of a script comprises providing inputs from a software component to the script.

In an exemplary embodiment of the invention modifying a behavior of a script comprises providing inputs based on one or more of user inputs and target machine configuration, In an exemplary embodiment of the invention modifying a behavior of a script comprises adding an interaction with a user before executing a script.

In an exemplary embodiment of the invention determining a desired change comprises creating a map of components and relationships between components for a target installation.

There is provided in accordance with an exemplary embodiment of the invention, a method of modifying a software installation, comprising:

(a) converting the installation to be a CIM-compliant installation, without uninstalling;

(b) modifying said installation using an CIM manager.

In an exemplary embodiment of the invention said modifying comprises one or more of moving software components of the installation, changing one or more names of components, changing one or more entries in a system record, adding a cache and adding a system file.

In an exemplary embodiment of the invention adding a system file comprises adding a manifest file to replace a registry entry.

There is provided in accordance with an exemplary embodiment of the invention, a method of manipulating a software installation, comprising:

(a) extracting at least part of a map of a software installation; and (b) modifying said installation based on said map.

In an exemplary embodiment of the invention said modifying comprises copying the installation to another computer.

In an exemplary embodiment of the invention said copying comprises modifying said installation while copying.

In an exemplary embodiment of the invention said modifying comprises moving the installation on a same computer.

In an exemplary embodiment of the invention said modifying comprises isolating the installation.

There is provided in accordance with an exemplary embodiment of the invention, a method of backing up an installation, comprising:

(a) extracting a map of the installation; and (b) periodically backing up said installation, based on said map.

In an exemplary embodiment of the invention said installation comprises an entire computer.

There is provided in accordance with an exemplary embodiment of the invention, a method of management of software, comprising:

(a) providing a plurality of computers, each installed with a plurality of software installations, form a plurality of unrelated vendors, at least two of the computers having different software configurations; and (b) centrally managing said installations on said computers at a component level.

In an exemplary embodiment of the invention centrally managing comprises managing at multiple layers of detail.

In an exemplary embodiment of the invention centrally managing comprises managing user settings.

There is provided in accordance with an exemplary embodiment of the invention, a method of installing software on a computer with an operating system, comprising:

(a) providing a plurality of software components and a list of interactions between the comments and locations for the components; and (b) copying of or linking to said components according to said locations and interactions such that said software is effectively installed on said computer with said operating system.

In an exemplary embodiment of the invention resolving comprises hiding said existing installation.

In an exemplary embodiment of the invention resolving comprises isolating said existing installation.

In an exemplary embodiment of the invention, the method comprises uninstalling an application using said tracking.

In an exemplary embodiment of the invention, the method comprises repeating said uninstalling and said installing a plurality of times.

In an exemplary embodiment of the invention, said installing and said uninstalling are from a portable data storage device.

In an exemplary embodiment of the invention said installing and said uninstalling are from a network storage location.

In an exemplary embodiment of the invention said software comprises a user desktop.

In an exemplary embodiment of the invention said software comprises a user profile.

In an exemplary embodiment of the invention said software comprises a set of user applications.

In an exemplary embodiment of the invention said software comprises a java JRE file.

There is provided in accordance with an exemplary embodiment of the invention, a method of extracting application settings, comprising:

(a) providing a profile of an application including locations of software components;

(b) checking for changes from said profile in an actual installation of said application; and (c) filtering said changes to remove changes due at least one of changes in an operating system and changes due to installed software other than said application.

There is provided in accordance with an exemplary embodiment of the invention, a method of extracting application settings, comprising:

(a) generating a system restore point;

(b) installing or modifying a software installation; and (c) comparing said system restore point with an instant system configuration, to detect changes in software components.

In an exemplary embodiment of the invention, the method comprises detecting which components belong to the software installation.

There is provided in accordance with an exemplary embodiment of the invention, a method of mobilizing an application, comprising, aggregating a plurality of components of said application under a single meta component.

There is provided in accordance with an exemplary embodiment of the invention, a mobilized application, comprising:

at least one meta component including a plurality of application components;

at least one installable component;

at least one isolatable component; and a bootstrapper adapted to mount said at least one meta component on a target system.

There is provided in accordance with an exemplary embodiment of the invention, a method of installing software from a storage location to a computing device with local storage, comprising:

(a) communicatively coupling said storage location to said computing device; and (b) mounting or linking at least one software component from said storage location into a file hierarchy of said computing device in a manner compliant with installation of said component on said computer.

In an exemplary embodiment of the invention, the method comprises mounting or linking a plurality of components which are expected by said computing device to reside on said local storage.

BRIEF DESCRIPTION OF THE FIGURES

Non-limiting embodiments of the invention will be described with reference to the following description of exemplary embodiments, in conjunction with the figures. The figures are generally not shown to scale and any measurements are only meant to be exemplary and not necessarily limiting. In the figures, identical structures, elements or parts which appear in more than one figure are preferably labeled with a same or similar number in all the figures in which they appear, in which.

DETAILED DESCRIPTION OF EXEMPLARY EMBODIMENTS

Software Transferor

While the patent application, in general, relates to various methods and apparatus, for clarity of presentation, the patent application initially focuses on a transferor application which can be used to transfer an installation from one computer to another. This will illustrate, for example, the informer modules, which serve the basis of some embodiments of the invention, in that they are used to delineate the interface between a software application and/or parts thereof and a system on which the software is installed. As described below, the informer can be used for other applications as well, and the present invention, in some embodiments thereof, encompasses uses which do not include an informer.

Figure 1:
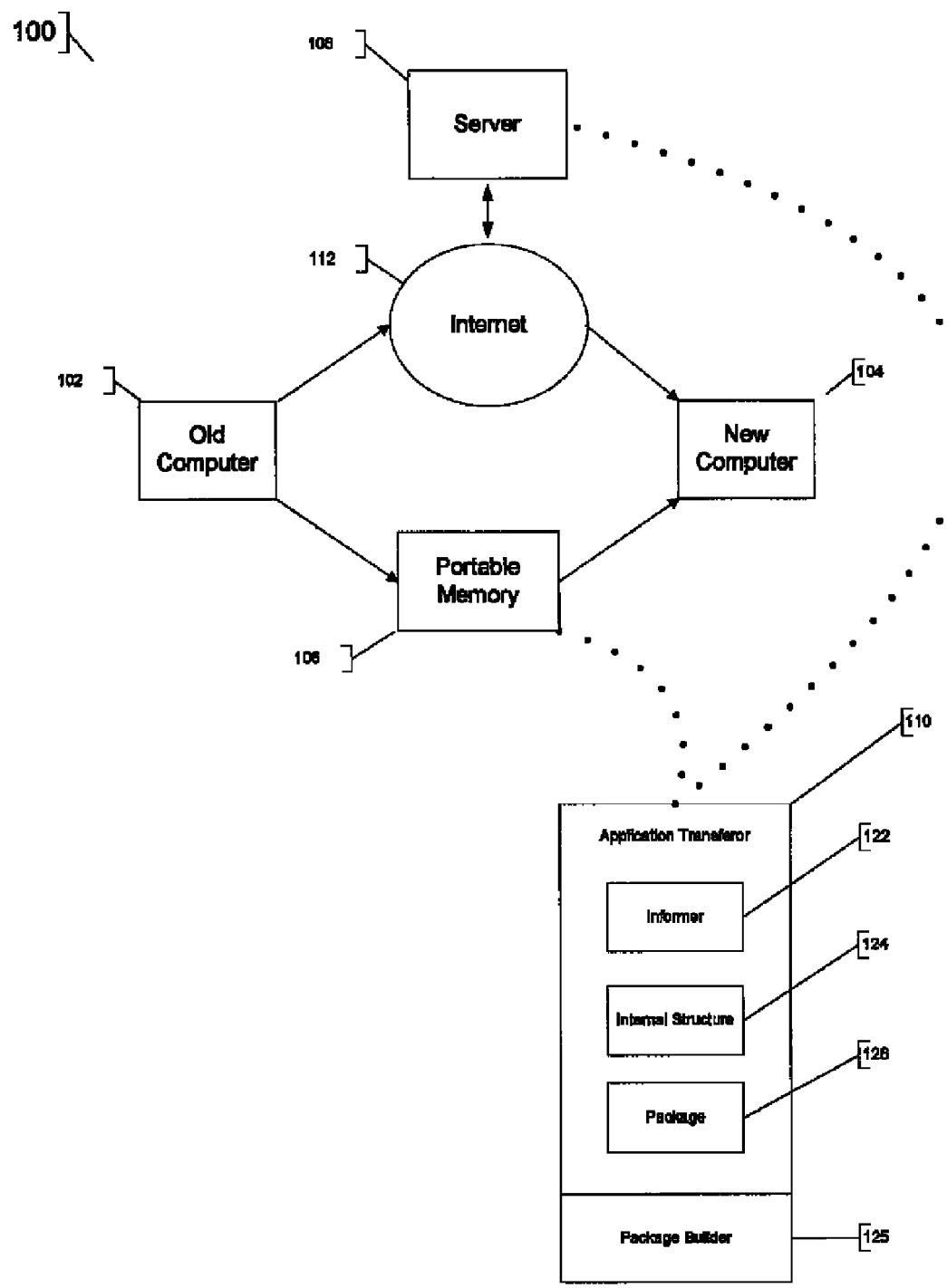
FIG. 1 is a schematic illustration of a software transferor, in accordance with some exemplary embodiments of the invention.

FIG. 1 is a schematic illustration of an application transferor 110 in a computer environment 100, in accordance with an exemplary embodiment of the invention. Application transferor 110 is used to transfer applications installed on one computer, such as old computer 102, to a second computer, such as new computer 104.

In some embodiments of the invention, application transferor 110 is located on a portable drive such as a flash memory drive 106, or any other portable memory unit and/or network storage. For clarity, the description will focus on a flash memory drive based embodiment. Optionally, flash memory drive 106 is first connected to old computer 102 and application transferor 110 is executed so as to collect information on one or more applications to be transferred and generate for these applications a software package 126. Flash memory drive 106 is then moved to new computer 104 with software package 126 and the software package 126 is installed on computer 102. As noted below, in some embodiments, the applications are extracted using a separate software and/or provided in mobilized form on the portable drive.

In other embodiments of the invention, application transferor 110 is located on server 108 and is executed from the server or is downloaded from the server to old computer 102 and is executed thereon. The resultant software package 126 is transferred to new computer, on flash memory drive 106, over the Internet 112 or using any other method, and the software package 126 is installed on new computer 104. In some embodiments of the invention, software package 126 is a standard installation package which does not require parts of application transferor 110 to be installed, or otherwise available.

Optionally or alternatively, application transferor 110 may be located partially on flash memory drive 106 and partially on server 108. For example, a start up unit may be located on flash memory drive 106 while the remaining portions are located on server 108. Alternatively, procedures used in routine use of application transferor 110 are located on flash memory drive 106, while routines used in special occasions and/or library data for identifying specific applications are located on server 110.

Optionally, application transferor 110 comprises an informer 122, which collects data within old computer 102 on the applications to be transferred and builds an internal structure description 124 based on the collected information. A package builder 125 uses the internal structure 124 to create software package 126. Application transferor 110 optionally does not require installation in order to run. Application transferor 110 may be provided for execution in substantially any suitable method, for example as an EXE file, a mobile assembly, a java application, a javascript, an hta application, a CIM/WMI service provider, a web based application and/or as an activeX module.

In some embodiments of the invention, additionally or alternatively to collecting the internal structure description 124 of the application, transferor 110 collects user customization of the application on old computer 102 and/or application settings thereof. In some cases, the two information types are collected as one.

Optionally, the data collected by application transferor 110 (e.g., internal structure 124) is located in the same location (e.g., flash memory drive 106, server 108) as application transferor 110 itself. Alternatively, the collected data may be stored in a different location from which application transferor 110 is stored. For example, application transferor 110 may be located on flash memory drive 106, while the collected data is stored in internal structure 124 located on server 108.

Thus, in some embodiments of the invention, a "map" of a software is extracted and then used and in others, the map is provided ahead of time. Furthermore, such a map may be used in various manners, including, for example, modifying an installation, porting an installation and modifying an installation package. In some cases the software being mapped/transferred is a complete application, multiple applications and/or fractions of an application.

Internal Data Structure

Figure 2:
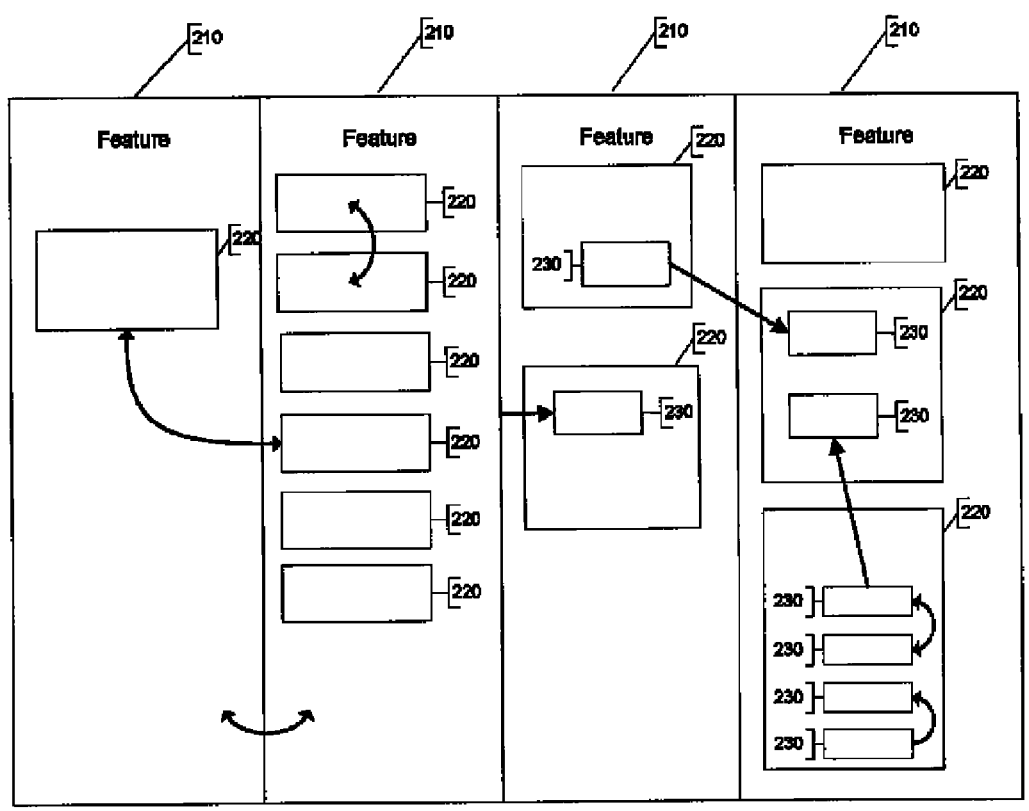
FIG. 2 is a schematic block diagram of an internal structure description of a software application, in accordance with an exemplary embodiment of the invention.

FIG. 2 is a schematic block diagram of an internal structure description 124 of a software application, in accordance with an exemplary embodiment of the invention. Internal structure 124 comprises one or more features 210 (in FIG. 2, four features), each of which represents a function of the software application. For example, a word processing software application may have a main feature and one or more optional features, such as a help feature, an equation feature and/or a spell check feature. Generally, when a software application is installed the user may determine whether to perform a complete installation or to perform a partial installation including only some of the features 210.

In an exemplary embodiment of the invention, a software component is formed of software elements, and a feature may include multiple components. In an exemplary embodiment of the invention, description 124 includes a table, wherein data is acquired for each such component, feature and/or element. As described below, the various informers and sub-informers provide this information to fill in the table. In some cases, the information collected is used on the fly, for example, as an input to another informer, before or instead of being placed in collection table 124.

Each feature 210 includes one or more software components 220, which perform logical tasks of the application. Optionally, software components 220 are classified as belonging to one of the following element types: executable components, code libraries (e.g., corn components, assemblies, drivers, plug-ins), fonts, registry keys, log files, cookies and/or registered objects. It is noted, however, that additional types of software components serving as logical building blocks of a software application may be defined and used in accordance with embodiments of the present invention. The arrows indicate associations between features, components and/or elements. IN a typical application there would be many more arrows.

Software Elements

Each software component 220 is formed of one or more software elements 230, which are the physical building blocks of the logical software component. The software elements 230 optionally can operate independently from the software application to which they belong. In an exemplary embodiment of the invention, the elements 230 are of one of the following types:

1) files including code, such as corn, dll and assembly files;
2) directories which list files belonging to a single directory;
3) configuration files, such as .ini and .manifest files, used to initialize the application;
4) environment variables related to the application, such as paths (e.g., a link to a directory of the application), profiles and constants;
5) registry elements comprising an entry in an operating system registry database; and/or
6) data files.

Optionally, internal structure description 124 lists for each element unit 230, an ID which uniquely identifies the software element, a type of the software element and a reference to a software component 220 to which the element belongs and/or to a parent software element, which represents the component 220. Other information which may be listed for some or all of the elements 230 includes a name, size, a file type (e.g., system, hidden, compressed, archive) and/or one or more access times, such as last modification time, creation time and/or last reading time. As noted above, the informer collects information about the element and/or higher hierarchical levels.

In some embodiments of the invention, alternatively or additionally to an association with the parent software element, the element unit lists a path of the software element. Optionally, the element unit lists a system location in which the element is to be located. In some embodiments of the invention, internal structure description 124 lists for each element whether it is used only during initialization or is used throughout the operation of the application.

In some embodiments of the invention, when possible, a plurality of elements 230 are grouped together into a single set to allow easier manipulation (e.g., copying). For example, when a plurality of variable elements are located together and/or a plurality of file elements are located together, they are grouped together based on the directory in which they are located. Optionally, the grouping may be unstructured or may be structured, for example in the form of an ordered list or a tree. For example, registry elements relating to application user settings are optionally combined into a single tree. For example, a HKEY_LOCAL_MACHINE\SOFTWARE\Mozilla registry tree can contain all registry keys for a Firefox application. In another example, Windows Life Services shortcuts are shortcuts for several applications forming an application suite, and which can be located together.

Optionally, each element 230 in internal structure description 124 belongs to only a single software component 220. If an element is identified as belonging to two different components or applications, the element is optionally duplicated and/or referenced. In an exemplary embodiment of the invention, when installing multiple applications, a non-existing component or element is created only once. An existing component/element is duplicated.

In an exemplary embodiment of the invention, the feature of a shared element is provided. Optionally, in non-MSI/CIM installation and/or if there is no breakdown into components, such components are created artificially and marked for sharing using operating system resources. In an exemplary embodiment of the invention, if two components share a same element, optionally within a same application, the components are artificially combined so that the element appears only once. Optionally or alternatively, the element is duplicated and/or referenced.

Information Collection

Figure 3:
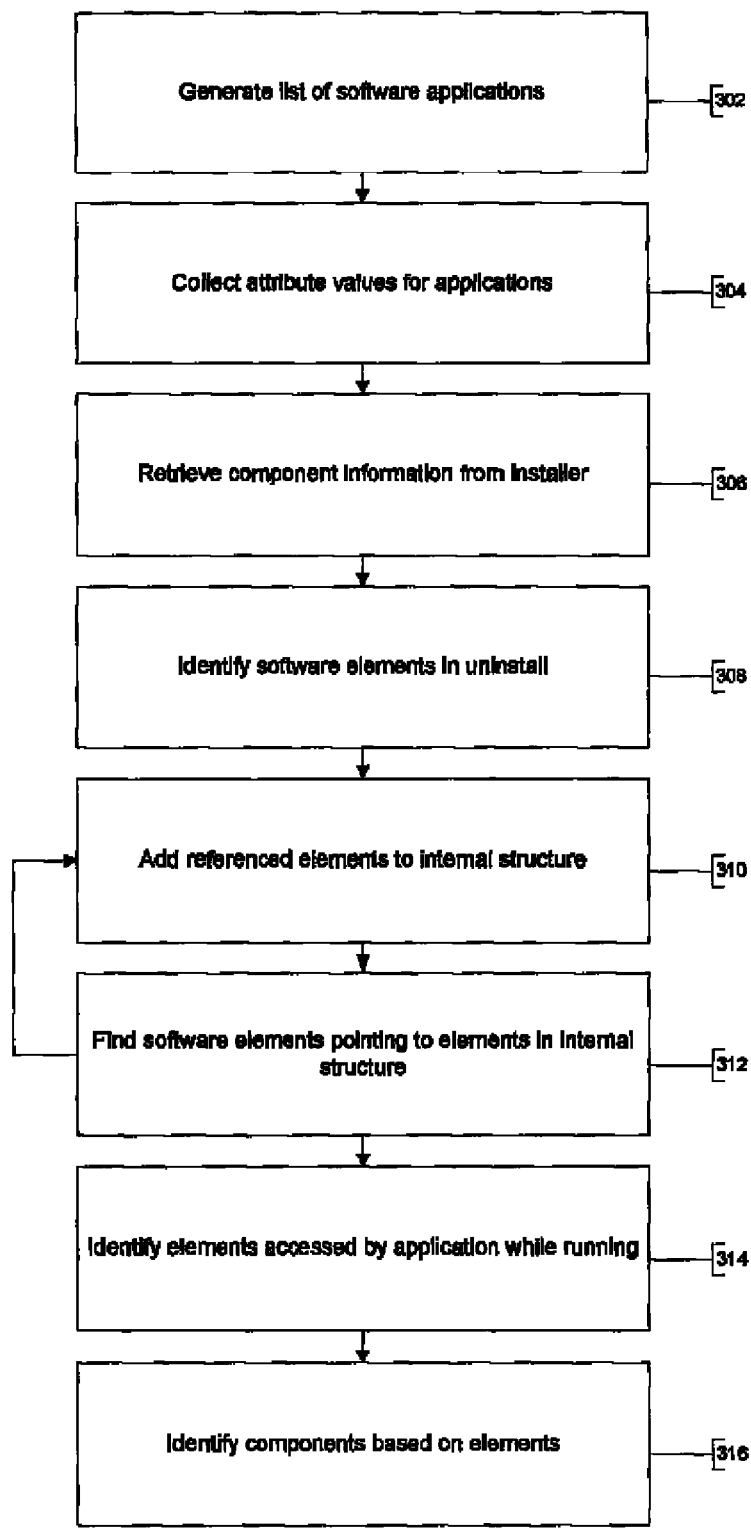
FIG. 3 is a schematic flow diagram of acts performed by an informer in collecting information, in accordance with an exemplary embodiment of the invention.

FIG. 3 is a schematic flow diagram of acts performed by informer 122 in collecting information on an installed application, in accordance with an exemplary embodiment of the invention. In an exemplary embodiment of the invention, the information is collected using a plurality of informer modules, each of which collects information of a certain type. It should be noted that some informer modules merely look up information. Other modules, however, apply various logical analysis and/or decision making methods and/or apply use non-determinative methods in providing information.

A particular feature of an informer in accordance with some embodiments of the invention, is an iterative method in which information is obtained, with first obtained information being analyzed to identify further locations to search for information in.

A particular feature of some embodiments of the invention is the grouping of software elements into components based on their interactions.

In an exemplary embodiment of the invention, informer 122 generates (302) a list of software applications installed on old computer 102, based on one or more listings of applications on the computer. Optionally, informer 122 also collects (304) attribute values of the applications in the list. In some embodiments, the list or identification of a software application is pre-provided.

In an exemplary embodiment of the invention, one or more particular softwares are selected, for example, based on user input or based on a policy. Exemplary policies include: damaged software, software needing update and software compatible with a different operating system.

Optionally, for each installed software application in the list, informer 122 accesses (306) one or more listings of components 220 and/or elements 230 of the application and adds the listed components and/or elements to internal structure 124 of their application. The software elements 230 included in internal structure description 124 of the application are searched (308) for pointers to other software elements 230. For each pointer found, informer 122 takes note of the element 230 in which the pointer was found and the element or directory to which the pointer directs. Alternatively or additionally to finding pointers in software elements 230 of the application in internal structure 124, informer 122 optionally reviews (310) computer storage locations, such as the hard disk of computer 102, to find software elements 230 that have a pointer to any of the elements 230 included in internal structure 124.

Informer 122 optionally reviews (312) the collected pointers to determine which ones lead from, or to, elements 230 that belong to the application or have a high probability of belonging to the application. In an exemplary embodiment of the invention, a weighted sum of confidence levels of a plurality of informers is created. If the sum reaches some threshold and there are no conflicts with decision polices and rules. (e.g., using an exclusion list and/or rule list), a decision is made that the element belongs to a particular application and/or component. The elements 230 having a high probability of belonging to the application are added to internal structure 124.

Optionally, the searching (308) for pointers in elements 230 of the application and the review of the hard disk of computer 102 for pointers to elements 230 belonging to the application is repeated until no new elements (not already listed in internal structure 124) belonging to the application are found.

Informer 122 optionally reviews the elements 230 added to the internal structure 124 to identify (316) software components (220) formed from one or more of the elements. Alternatively or additionally, in collecting the information on the elements 230, informer 122 collects along with the elements, when available, the software components 220 from which they are constructed and/or the features 210 to which the elements belong.

In an exemplary embodiment of the invention, at least 5, 10, 20, 30 or more interaction points are examined. Optionally, in a second round of examined interaction points (due to information garnered during a first round, at least 1, 3, 5, 10, 20 interaction points are examined. In an exemplary embodiment of the invention, the software includes at least 10, 20, 40, 100, 300, 700 or more elements, 3, 5, 10, 14, 50, 200, 500 or more components and/or 3, 6, 10, 30, 60 or more features. In some cases, intermediate numbers of elements, component and/or features will exist.

List of Software Applications on Computer

Referring in detail to generating (302) the list of software applications, in some embodiments of the invention, the list of applications is generated based on a listing of executable programs on computer 102, for example a list of programs in a start menu of an operating system, for one, some or all of the users of the computer. Alternatively or additionally, the list of installed software applications is collected from a list managed for an uninstall control of computer 102. Further alternatively or additionally, the list of installed software applications is taken from an installer application running on computer 102. For example, the applications on computer 102 may be determined from the MSI cache. Further alternatively or additionally, the list of installed software applications is determined from reviewing a directory in which files of installed programs are stored, such as the "program files" directory (e.g., /root/etc of Linux). The location of the program files directory may be predetermined or may be determined by accessing a system variable indicating the location. In some embodiments of the invention, in determining the list of software applications, a list of recently used applications and/or times at which each application was most recently used, is accessed.

In an exemplary embodiment of the invention, a record is made (e.g., and stored on a server or in the transferor) of a correct order to install applications/components, for example, for supporting file extension linking. This information may be used when extracting a map and/or as part of instructions for a new installation package created.

In some embodiments of the invention, informer 122 stores, manages and/or downloads information (e.g., complete or partial maps) relating to the installation locations of popular software applications, such as popular operating systems (e.g., Linux, Windows), browsers (e.g., Explorer, Firefox) and/or viewers (e.g., acrobat reader). Optionally, informer 122 searches the known installation locations to determine whether the popular applications were installed on the old computer 102. Additional information may be stored for such popular applications, for example one or more of locations of add-ins, component associations and/or information about components created in runtime (not at installation time), e.g., MS Office creates some components only one time when it firstly runs on a pc.

In addition to identification of the application, informer 122 optionally collects for the applications a path to their application directory. Optionally, informer 122 additionally collects for some or all of the applications attribute values, such as name of application, its version, installer type, install date, install location, install source, install scope and publisher. This information is optionally used in searching for elements belonging to the application.

When the application information is determined from more than one source, informer 122 optionally merges the lists generated from different sources. Optionally, in merging the lists, informer 122 cancels duplicate listings. In some embodiments of the invention, applications are considered the same if all their components and features are the same. It should be noted that multiple versions of a same application may be present on a single computer, or made to be present.

In an exemplary embodiment of the invention, information returned by an informer is associated with a confidence level. Optionally, information is used if it passes a confidence threshold and/or if provided by multiple informers. Optionally, information with low confidence is used if there is no better information.

In an exemplary embodiment of the invention, different types of source shave different confidence levels. For example, the confidence level of informers extracting information is higher than confidence levels of informers which deduce information from facts. Optionally, there is a hierarchy of confidence levels also within the two types of informers, for example, some "facts" may be considered more reliable than others. In addition, for some embodiments, in some cases, when in doubt a positive decision is made and in other cases a negative. This may be, for example, programmed into the informers and/or provided as modifiable rules and/or other settings.

Optionally, the confidence levels are settable parameters, for example, per application, informer and/or transferor tool. Optionally, the tool can connect to a remote site and update new interaction points to analyze, informer tools and/or confidence levels. Different updates may be applicable to different target software and/or host configurations and are optionally indexed as such at an update source site. Optionally, a transferor includes a learning algorithm, which learns confidence levels according to a trial and error method, whereby, for example, a user indicates failures and the transferor analyses missing or extra components according to sources of the information and therefore decision confidence levels.

Collecting Information from Lists on the Computer

Referring in detail to accessing (306) one or more listings of application components and/or elements 230 on computer 102, in some embodiments of the invention, informer 122 accesses an installer, for example, windows installer (MSI), InstallShield, WISE or Nullsoft Scriptable Install System (NSIS). The information from the installer is optionally retrieved directly from the installer's cache, registry and/or files (e.g., unstall.exe if used). In an exemplary embodiment of the invention, MSI cache on "c:\WINDOWS\Installer" directory is used and/or a NSIS cache found in the unstall.exe file under the NSIS compliant application folder. Alternatively or additionally, the information is collected using an interface program such as a DMTF compliant management program (e.g., CIM) or other management standard compliant program such as the windows management instrumentation (WMI, implementing CIM on Windows).

Alternatively or additionally to accessing an installer, informer 122 accesses an uninstall control of the software application and identifies (308) software elements 230 that are listed to be removed by the uninstall control. These software elements 230 are added to internal structure description 124 of their application.

Further alternatively or additionally, informer 122 controllably executes the application, and while the application runs, informer 122 monitors the software elements 230 that the application accesses. Optionally, in controllably executing the application, optionally invisibly to a user, providing artificial inputs by the transferor, the output of the application is directed to a temporary file, so as not to interfere with a human user of computer 102.

In some embodiments of the invention, application components 220 and/or elements 230 are collected from the main directory of the application. Alternatively or additionally, informer 122 manages information on the components 220 and/or elements 230 of popular applications and using this information finds these components and/or elements on computer 102. Optionally, in accordance with this alternative, informer 122 manages lists of the names of the elements 230 of the popular applications and searches for these elements on computer 102. Alternatively or additionally informer 122 stores information on the directories in which popular applications store their elements 230.

In an exemplary embodiment of the invention, one or more of the following locations are analyzed to detect possible software components of the application and/or dependencies thereof: shortcuts, recently used files and plug-ins.

For example, on the windows operating system, application short cuts are optionally searched for in one or more of "recently used files", "program files", "start menu", "startup menu" and/or "recent applications". Application executables are optionally searched for in one or both of event logger and prefetched files.

Finding Associations (308, 310)

Referring in more detail to searching (308) for pointers to other software elements 230, in some embodiments of the invention, informer 122 reviews text files for strings that appear to be pointers to other elements 230. Alternatively or additionally, informer 122 reviews binary files, such as DLL, registry and/or exe files, in internal structure 124, to identify embedded string references to other files. Such analysis may also be performed in run time, for example, by analyzing executing and/or loaded DLL and EXE files.

Referring in more detail to reviewing (310) the hard disk for pointers to elements 230 of the application, in some embodiments of the invention, the entire hard disk is searched in order to ensure that all elements are found. Alternatively, for example to allow for a faster review, only elements of specific types are reviewed, for example only registry elements, shortcuts, configuration files and/or environment variables of the computer, as other software components do not generally have pointers to other software elements and/or other software components having pointers will be identified using other acts of informer 122.

Exemplary pointers include URI, ID, unique names, environment variables, shortcuts and other unique items on the system.

In an exemplary embodiment of the invention, associations other than pointers are searched for. For example once an element is found and its type deduced, elements preceding that type of elements can be found. For example, if it is deduced that a dil file is type of com object, registry keys are searched for and vice versa. In another example, if a font file is a "true type font" type, a search is made for its registration in a registry, and vice versa. In another example, two executables may be associated, if one is set up to execute the other.

Optionally, associated elements are combined into a single component and/or associated components combined into "features".

In some embodiments of the invention, alternatively or additionally to reviewing the computer locations (e.g., hard disk) of the system of computer 102 for pointers, the registry of computer 102 is reviewed for entries having names similar to the name of the application or the vendor of the application. Possibly, the review for pointers and for files of similar names is performed in a single pass, for example if the combined review achieves faster operation. Further alternatively or additionally, the registry or other computer locations are reviewed for files having similar names to elements 230 already identified as belonging to the application. Similar names are, for example, names which are the same except for their extension or which are the same except for some postfix, possibly which is formed only of digits.

Another option used in some embodiments of the invention involves reviewing the system variables and associating each variable with its application. Similar procedures are optionally used for other types of elements 230 which are easily identified and it is possible to identify from them to which application they belong.

In an exemplary embodiment of the invention, two or more of the following components are distinguished: Com objects, registry, File, environment variable, .ini ODBC, assembly and fonts. Optionally, one or more of the following classifications are recognized as well: Executable, Code library, plug-in and/or System driver.

In an exemplary embodiment of the invention, such a component is treated as being formed from sub-elements, rather than being atomic. Optionally, the map include associations between such sub-elements, components and/or application(s). For example, a component can be, a manifest file, a registry key and/or a DLL matching such a file and/or a key.

Identifying Structure

Referring in more detail to identifying (316) software components formed from the elements 230 of the application included in internal structure 124, in some embodiments of the invention, informer 122 is configured with known component structures and accordingly determines groups of elements 230 forming an component 220. In an exemplary embodiment of the invention, some or all of the following software component structures are defined, each of which can include one or more elements from file system elements, registry elements, initialization elements and environment elements:

1) Font components which include one or more font files and a registry entry.

2) Configuration components which include one or more configuration files with a registry entry.

3) Executable components formed of one or more executable file and a registry element. The executable file may be, for example, a Win32 executable file with an exe or a com extension that contains the binary representation of machine instructions of a specific processor. A "Net" executable that requires .Net framework to be executed. A Java executable that is a file with a jar or a class extension that can be executed using a Java Virtual Machine. A Hypertext application (HTA) which is a HTML file executed by web browser; a Script executable that is a file containing Java or VB scripts and can be executed via WSH (Windows script host); and/or one or more WSH job files with .wsf and .scf extensions.

4) Code Library components formed of one or more executable files and/or part of file and/or configuration file or registry elements. The library can be DLL file (a dynamically linked library which is linked to an executable at run-time and loaded into a process address space).

5) Hypertext components (HTC) can be formed of HTA and HTML files and/or script code inside such files.

6) Data file components formed of different file elements. These can be, for example, multimedia files, documents, xml, csv, etc.

7) Registry components can be formed of one or more registry records.

8) Assembly components are atomic units of code that are isolated, self-contained, and self-described by a manifest. Such a component can consists, for example, of one assembly file, one or more resource files, a manifest file and/or a catalog file grouped under a unique version depended name. The assembly name optionally consists of a manufacturer name, component name, version and unique ID.

7) Com Object Components formed of executable or code library components or elements and registry entries describing Class, Interface, Application, Programmatic identifier, File extension and/or MIME Optionally, the following component types are provided, mirroring the above structures, (although others, fewer, or more or different may be provided):

a) registry;
b) file;
c) font;
d) code library, for example a system driver, a plugin, a screen saver, an OBDC driver, an assembly and/or a service; and/or
e) executable, for example, a shortcut, a corn object, possibly a service and/or an assembly.

Optionally, for each component structure, informer 122 is configured with information on which type of element generally points to other elements 230 of the component. These elements are reviewed to determine whether they belong to a software component with one or more other elements belonging to the application. For example, the registry elements are optionally reviewed to find the elements (for example ODB drivers) to which they point and with which they form a component. Optionally, for font components, the font file elements are reviewed, to determine their corresponding registry element.

Alternatively or additionally, informer 122 reviews elements not yet associated with software components, to identify groups of elements belonging to a single component, for example based on the elements having similar names, for example, similar prefixes or other sub-set character strings.

It is noted that the identification (316) of software components may be performed after the collection of elements 230 is completed and/or may be performed in parallel to the collection of elements, such that for each collected element informer 122 immediately determines to which component it belongs.

Decision Making

A particular feature of some embodiments of the invention is that software installation components/elements are identified by analyzing hints found in the installation. In an exemplary embodiment of the invention, the process is iterative, with initial findings leading to further findings. In an exemplary embodiment of the invention, the analysis is non-determinate, in that decisions are made by the informer(s). Such decisions may have varying levels of confidence and/or may be based on various, and possibly conflicting, information/hints.

Referring in more detail to reviewing (312) the collected pointers, in some embodiments of the invention, if a pointer leads to a directory, all the files in the directory are considered as to whether they belong to the application.

In some embodiments of the invention, if more than a predetermined percentage of the files in a directory are identified as belonging to the application and/or if all the executable files of an application are in a directory the whole directory and files therein (and optionally sister directories) are flagged as potential or definite elements. Optionally, the predetermined percentage is above 60%, above 70% or even above 80%, so that not too many components that do not belong to the application are associated with the application. Optionally, the spread of creation dates in the collected files is used to assess belonging to a same application. For example, it may be assumed that all files and/or all executables and/or all files of a certain type have a same creation date. If the date is not the same, a confidence level may go down, for example as a function of the spread of dates. Optionally, if a bi-modal distribution is found, only files with dates in one mode are collected. Optionally, when extracting only some files, they are moved to a separate directory. Optionally, extra files are removed when detecting conflicts in a later reinstallation.

Referring in more detail to reviewing (312) the collected pointers, in some embodiments of the invention, whenever there is a doubt whether an element 230 belongs to the application, the element is added to the application in order to be on the safe side. Optionally such elements are removed (or added or their confidence level changed) later, for example as described below, by a cleaning process. Optionally, the cleaning process is as follows:

(a) Using a predefined list of components, identify components that may be added later (so add them earlier), due to OS activity.

(b) Using a redefined list of well know application components that may share components, identify components and/or elements that may need to be added.

(c) By observing several applications, components and/or elements that more probably belong to one application and less probably to another application, are identified. Confidence based decisions methods as described herein may be applied.

Optionally, the review is performed using one or more of the following rules, which can be used to identify, for example, missing parts of the map and/or parts that should be in a map. In an exemplary embodiment of the invention, heuristics are used to identify elements that are in map and rules and/or policies are used to identify which elements are not in map. Optionally, for conflict resolution, confidence levels of informers are used with thresholds. Optionally, confidence level, rules, polices and/or thresholds are updated via experiments and/or research. Optionally or alternatively, self learning methods, such as AI algorithms, are used, for example, to update numerical values.

1) pointers from an index are not included in the application. Optionally, a list of exclusion elements and/or associations is maintained, including for example, elements known to be part of operating system, for example, supplemental components created by an operating system to optimize performance and/or simplify maintenance.

2) checking that the elements are related in some way to a pointer associated with the application name. For example, an elements prefix should, in some embodiments, match the application name, for example, being defined to have a lexicographic distance of less than three (or some other prefix).

3) searching in specific registries for specific element types and rejecting if there is a mismatch (e.g., looking for com objects in a com registry).

4) assuming that a folder name should be at least similar to an application name and using this for rejecting elements or for suggesting what application an element may relate to. Optionally, such names that are similar are matched up with applications from a list of installed applications, acquired, for example, as described above.

5) compare confidence level, for example, based on informer source. Optionally, a "confidential level" is associated with each informer and/or data types and/or methods of finding data by the informer. Optionally, the confidence level is first applied on an informer level and then composited for information found by multiple informers. Optionally, information (e.g., associations) are accepted if they pass a minimal confidence level and/or if they are of a higher relative confidence. In one example, MSI informer is assumed to provide data with a higher confidence and a registry informer is assumed to have a lower confidence level, for example, as related elements may turn out to be plug-ins. Optionally, each decision is associated with a confidence level, optionally calculated by combination (how) of the confidence levels of the sources of the information.

6) based on an identification of the executables of the application.

7) based on an identification of an application main directory. The executables in the directory and sub directories and files are optionally counted and compared to a list of entries found in other source. Optionally, all the files in the main directory (optionally identified by name being similar to application name or identified by entries in the registry pointing to the directory or subdirectories thereof) are assumed to be parts of the application.

In some embodiments of the invention, informer 122 includes, in internal structure 124, only elements that are actually present on computer 102. Alternatively, when informer 122 identifies elements that belong to the application although they are not present on computer 102, these absent elements are included in internal structure 124 for repair and/or diagnostic purposes.

Another possibility is to include in internal structure 124 fewer than all the elements on computer 102, belonging to the application. Optionally, elements which can be reconstructed based on other elements in the component to which they belong are not included in internal structure 124, but rather are reconstructed when necessary. In an exemplary embodiment of the invention, a determined map is updated using a previously acquired map of the application (e.g., downloaded from a remote location).

In some cases, some components (e.g., code libraries components) must contain several elements to be correct. If an element is discovered to be absent (for example, by comparing to a table of elements for components or based on internal links in the component), the missing element is optionally recreated, for example, by one or more of remote download, calling an installation API, searching in storage location on the host and/or other computers with similar installations and/or peer-to-peer networks. Optionally, the peer-to-peer network is constructed using the transferor or other software and is used to share information regarding installation between computers with a suitable client.

Operation Hints

In some embodiments of the invention, informer 122 receives operation hints from a human operator, including for example directories in which to search for applications and/or elements of applications. Alternatively or additionally, a human interface of the informer 122 asks the human operator on specific elements or components whether they belong to the application. Optionally or alternatively, a user is requested to operate one or more feature of the application, for example, one which, in the application, is linked to a particular component. Optionally, list of components and features is provided, for example, at a central repository. Optionally or alternatively, a user is asked to operate the application, for example, to monitor access of the application to files and registry locations and/or modifications thereof. Optionally, a list of suitable activities and expected results are provided at a central repository.

As mentioned above, various acts of informer 122 are performed, in some embodiments of the invention, based on information on popular applications. It is noted that any of the acts of informer 122 may be based on such information and not only those for which this option was mentioned specifically. Optionally, the information on the popular applications is provided with application transferor 110. Alternatively or additionally, the information on applications is downloaded during the operation of application transferor 110 from a constantly updated web site. In some embodiments of the invention, the information is downloaded as a standard step of the operation of application transferor 110. Alternatively, information is downloaded only when problems in collecting information using other methods is encountered.

In some embodiments of the invention, the information in the web site on popular applications is updated centrally by a human operator. Alternatively or additionally, the information in the web site is updated automatically based on information collected from application transferors 110. Optionally, each time an informer 122 contacts the web site, the informer 122 receives a list of popular applications for which there is information. Informer 122 then requests information on applications for which it needs such information and provides the web site information on applications not included in the list received from the web site. Alternatively or additionally, for one or more applications, informer 122 compares the information it has on the application to the information at the web site and updates the web site with information it does not have. Further alternatively or additionally, informer 122 provides the information on the application to the web site, which performs the comparison.

Alternatively or additionally to using a general web site, information on popular applications may be traded using any other file sharing methods, including methods not including a central host. In some embodiments of the invention, alternatively or additionally to a central web site, each informer 122 collects information from previous executions and uses the information to achieve faster and/or more accurate operation in later executions of informer 122.

Collect Personal and/or Setting Data

In some embodiments of the invention, in addition to collecting information on the current state of an installed application, informer 122 collects information on the default values of the application, from the default user settings on computer 102. For example, in Windows operating systems there is a default user profile component that is used to create a profile for new user. A new user receives a default application settings set in the default profile. In an exemplary embodiment of the invention, such a default profile is used to determine which application settings are default In some cases, the settings include operating system settings, for example, from such a default user profile.

Optionally, user settings are found in a cache of the system default user or in configuration data for a class instance (e.g., read using a standard API).

In an exemplary embodiment of the invention, an informer software and/or hardware is used to extract only user settings, which settings may be applied to a same or different application, on a same or different computer. Optionally, this is used to identify which components and/or elements form customizable application settings.

In an exemplary embodiment of the invention, one or more of the following rules is used:

(a) Components recorded inside user profile are assumed (with a high confidence level) to be customizable.

(b) Components/elements with a modification date after installation are assumed to be customized.

(c) Read only components, or components which need administrative privileges for access are assume, with high confidence, to be not customizable.

(d) a knowledge base, local and/or remote may be used, which lists customizable components per software manufacture/software suite/application.

After identification of customizable components a partial installation map of the application is optionally created. An update may be applied on a similar application and/or on another computer in a manner which will update only those customizable components.

In an exemplary embodiment of the invention, a user installation is changed with respect to which user owns the application and/or various access privileges thereof.

In an exemplary embodiment of the invention, the installation is changed by moving components from a general location to a user specific location or vice versa. For example, a font file may be moved from a user profile to C:\WINDOWS\Fonts. In an exemplary embodiment of the invention, one or more of the following component updating rules is used:

(a) Using well known places for per machine or per user locations.

(b) Using information from an installer cache to determine where a component should be placed for per machine or per user scenarios.

(c) Monitoring application access to files and/or registry to deduce where components are looked for.

Optionally or alternatively, component locations may be changed between users.

Optionally, an application mapping/extraction includes identifying user files that are used and/or accessed by the installation. In some cases, there are system modules that are loaded and maintained per user. If the installation registers a component inside such a module, then such a component is part of user customization. For example in Linux, each user account has a .tch file that contains configuration per user. If an emacs application, for example, locates its configuration file there, then the configuration file is per user.

Exemplary Multipurpose Installation Software

Figure 4:
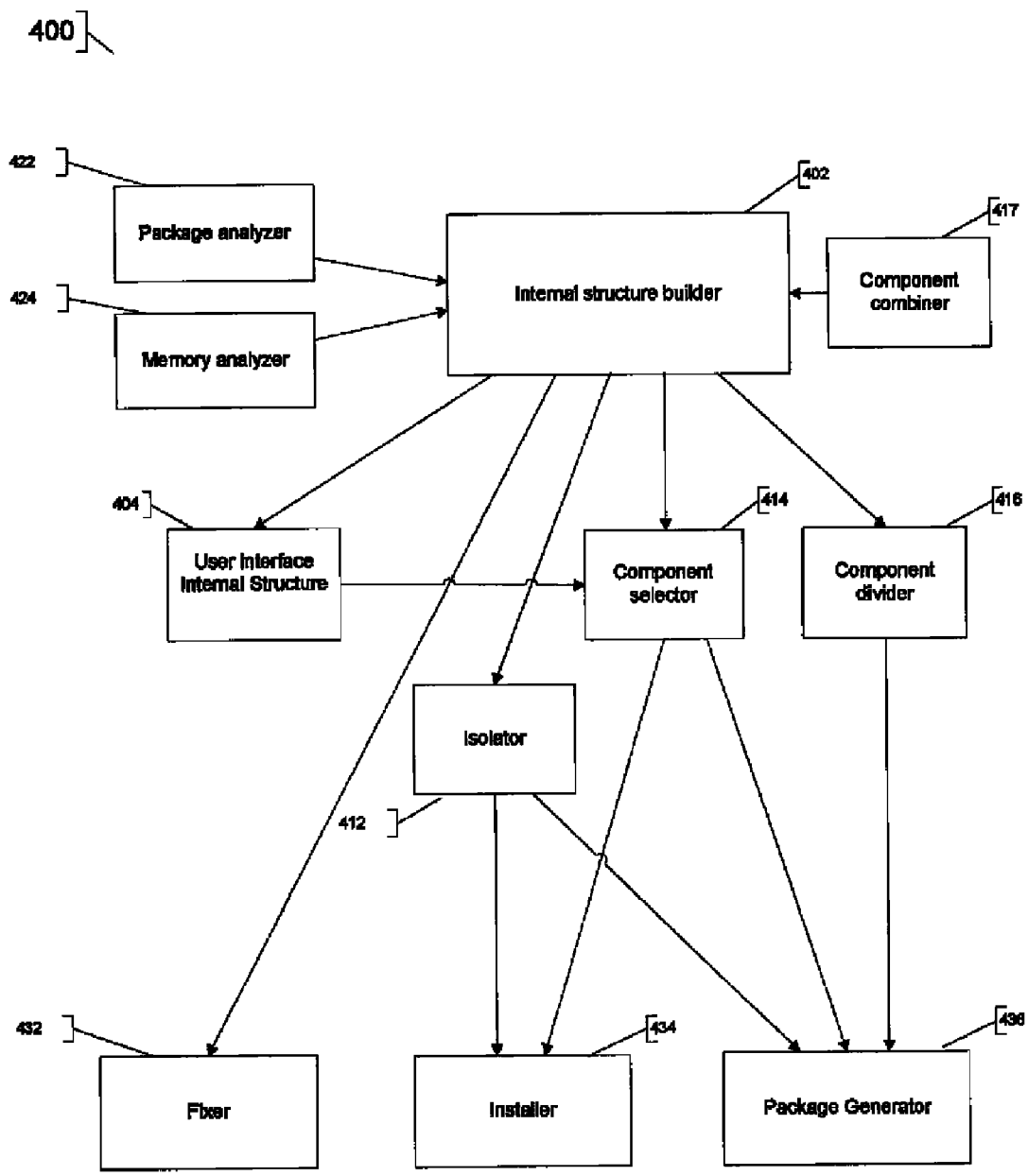
FIG. 4 is a schematic block diagram of modules of a multipurpose installation software tool, in accordance with exemplary embodiments of the invention.

FIG. 4 is a schematic block diagram of modules of a multipurpose installation software tool 400, in accordance with exemplary embodiments of the invention. Multipurpose tool 400 includes an internal structure builder 402, which is adapted to generate internal structure descriptions of software applications, for example using the methods described above. A package analyzer 422 is optionally used to analyzer a package created by the methods described herein and/or analyze an installation using an installation cache and/or uninstall data. Alternatively, internal structure builder 402 receives information from a memory analyzer 424 adapted to collect information from reviewing the installation of the software on a computer system, such as old computer 102. In alternative embodiments, fewer than all the modules are provided. Optionally or alternatively, the software is not a multipurpose software or has limited functionality as compared to the following description.

In some embodiments of the invention, multipurpose tool 400 comprises a user interface 404 through which a human user may indicate which task (or tasks) multipurpose tool 400 is to perform and/or the parameters of the task to be performed.

Optionally, installation software tool 400 comprises a fixer unit 432 adapted to fix errors in the installation of software applications. Alternatively or additionally, software tool 400 comprises an isolator 412 adapted to isolate software programs such that they can operate on their own without requiring other software units and/or without interfering with other software units.

A particular feature of some embodiments of the invention is that control over individual software elements is available. In general, manipulation, checking and comparing of such elements is relatively simple as they are single elements accessible via an API. This contrasts with typical installation systems where complexes of such elements are treated as units, making such manipulation complex or impossible.

In an exemplary embodiment of the invention, use is made of a finer resolution of software elements, so that repairing can identify missing or corrupted elements and repair/replace them. This may be simpler to do than for compound components, where comparison or even detection of damage may require comparison to a record of installation, which may be unavailable or incorrect.

Optionally or alternatively, to repair of components, control of software elements is used to provide version control (e.g., to allow updating parts or all of a component) and/or conflict resolution (e.g., when there are two versions of an installed software and not all the components match, the software elements indicate the exact mismatch). In an exemplary embodiment of the invention, version control uses a typical practice by which components are registered under paths that use the scheme "{<publisher>/<product>/<version>/<language>}". In some embodiments of the invention, fixer 432 checks each component of the internal description to determine if it needs to be repaired.

Software tool 400 optionally comprises a package generator 436 adapted to generate a software installation package based on an internal structure built by builder 402. Alternatively or additionally, multipurpose tool 400 comprises an installer 434 adapted to directly install a software in the computer, without preparing an installation package. For example, when desired to isolate one or more programs installed on a computer running software tool 400, internal structure builder 402 may be used to generate the internal structure of the programs, isolator 412 isolates the programs and then installer 434 reinstalls the programs. In another exemplary embodiment of the invention, installer 434 is used to transfer an installed program from one storage unit (e.g., disk) to another.

Alternatively or additionally, software tool 400 comprises a component selector 414 which selects components to be used in specific instillations, for example under instructions received through user interface 404. In some embodiments of the invention, software tool 400 comprises a component divider 416, which is adapted to divide the components of an installed software into a plurality of different groups, which are handled differently.

In an exemplary embodiment of the invention, a component combiner 417 is provided which generates new components and meta-components and/or features from found components and/or elements.

In an exemplary embodiment of the invention, builder 402 includes the ability to analyze program while they are executing, for example, as described herein.

In an exemplary embodiment of the invention, a watcher is provided to monitor running applications and/or execute applications in an invisible mode. Optionally, one or more artificial inputs are generated to operate one or more application features. Optionally or alternatively, the application is searched for standard command strings, such as "open file", "edit" and "select all" in a user interface and then these strings are monitored (e.g., using hooking), when access (or when a function linked to then is accessed) to view, one or more of modules loaded for execution and/or file and/or registry access.

In an exemplary embodiment of the invention, builder 402 uses one or more informers to collect some or all of the information used by software 400. In some cases, the missing information is provided by a user, optionally based on informer data (e.g., selecting among options). In other cases, the information is provided by a pre-provided database, for example, of a same or other installed software.

In an exemplary embodiment of the invention, an application database is maintained which includes information as to common features of applications installations, based on, for example research and testing and/or user usage of the transferor tool, with optional reporting of discovered installations and/or problems. Optionally, a user error reporting tool is provided. Optionally, in response to errors, a suggestion of what components to add is made to the transferor software to apply at a next execution.

Match New Environment

In an exemplary embodiment of the invention, software 400 is used to adapt an installation to a new environment.

In one example, the new environment is a different operating system configuration, possibly a different version of an operating system or a same version with different operating system components installed.

In an exemplary embodiment of the invention, the mapping (internal representation) indicates for the current installation, various properties, including, for example, one or more of which components are provided, what fonts are available, operating system version and/or configuration, hardware version and/or configuration (e.g., and missing abilities supplied by software) what language is supported, what plug-ins are available, what support software (e.g., a browser) is provided and/or user settings.

In an exemplary embodiment of the invention, software 400 can determine (or be notified) what are the relevant properties on the target system. In some cases, the matching is automatically applied for a range of applications. In some cases the matching is applied per application type.

In one example, if a target computer has a different operating system, the elements forming one or more of the components can be changed accordingly with matching elements for the target operating system.

In another example, if a support browser is changed from internet explorer to FireFox, then the method of accessing cookies may be changed, from file to database. In various applications, if plug-ins are supported, access to internal data structures are supported as well and used as described herein.

In another example, the matching includes adding patches or outside components (such as operating system language support. Optionally, such elements are added using MSI and/or another installation engine.

If the operating systems are not generally compatible, a component in the form of middleware that allows one operating system to execute a program for another operating system, may be added.

Optionally, software 400 downloads desired operating system components or other components, as needed, for example, during installation or when preparing for installation. IN this and other cases, missing components/elements may also be supplied by other means, for example, one or more of from a CD, disk, network storage, central application component database and/or form a same application on another PC, which is connected by network.

In an exemplary embodiment of the invention, the installation uses a different component and/or setting based on ability of target computer, for example, CPU, memory and screen resolution (each of which may suggest a different display driver, for example).

User Configuration and Application Transfer

In an exemplary embodiment of the invention, software 400 is used to reconfigure an installation. In general, in the past, software was installed as is, optionally with a user selecting from among pre-defined components. If an installation was transferred, it was transferred as-is.

In an exemplary embodiment of the invention, a user is provided with choice, for example, at the level of applications (e.g., which ones to transfer/install), at level of components and/or at levels of features. Optionally or alternatively, a user can reinitialize an installation and/or copy user settings only to such an application. Optionally, the choice is applied at run-time and/or when installing and/or when generating an install package or package modifier.

In a particular implementation, a general transfer method, for example, server based installation, is used to install a basic software and a software 400 is used to modify the installation and/or transfer particular user-relevant elements, such as user settings or specialized components.

In an exemplary embodiment of the invention, a different user profile is provided for each installed application, optionally, by providing a different extension of the user profile for different installations.

In an exemplary embodiment of the invention, component selector 414 is used to select what components to include. For example, once the target operating system is known, components provided for compatibility with other operating systems can be removed from an installation. In an exemplary embodiment of the invention, this is carried out in non-MSI and/or other non-CIM compliant installations.

In an exemplary embodiment of the invention, user configuration comprises aggregating a plurality of elements and/or components into new features. Such aggregation may be manual or automatic.

In a standard situation, vendors create application installation and a Sys Admin wishes to change the installation for corporate users. This is optionally performed by performing the following steps:

(a) create a snapshot of clean computer;
(b) install application;
(c) while installing application, if possible, chose appropriate features and configurations;
(d) install additional add-ons, if necessary;
(e) run and customize application;
(f) create new snapshot; and
(g) a difference between the two snapshots is an installation transformation.

In an exemplary embodiment of the invention, such a transformation is created without application installation, by analyzing an installation and converting it into a new installation package by removing features, components, and adding add-ons components. Optionally, a sys admin may create an installation package which use a different installation technology from what was originally provided. In an exemplary embodiment of the invention, the installation package is canonized by converting it into a CIM compatible installation.

Component Divider

In an exemplary embodiment of the invention, a single component may be split into sub-components for various reasons. For example, a component may be split to create new components or new features, to simplify version control and/or repair and/or to allow supplying part of a component from one location (e.g., hard disk) and part from another (e.g., network and/or portable storage). For example, a computer may be preinstalled with a plurality of components. Relatively small elements may be provided on a portable memory or via a wired or wireless connection, to complete the component definition/customization and/or to act as a key or other security measure to prevent usage without authorization.

In an exemplary embodiment of the invention, the component divider comprises a table of pairs of scripts, with a first script or pattern identifying a component and a second script defining how to split it.

In an exemplary embodiment of the invention, components are divided by identifying different treatment of elements of the components by different installation scripts.

In an exemplary embodiment of the invention, components are divided up according to size and/or content.

In an exemplary embodiment of the invention, some of the divided up component parts are protected or unprotected.

In an exemplary embodiment of the invention, components are classified and splits as sets of components and/or elements that form the components. In an exemplary embodiment of the invention, a component is classified based on one or more of components parameters such as type, size, or path; by component usage such as usage frequency and dependencies; and/or by component installation type, such as isolatable, plugable and/or installable.

In an exemplary embodiment of the invention, an installation package is created for each for each set of components/elements. Optionally, such a package includes a bootstrapper component. In an exemplary embodiment of the invention, each component can have a selected deployment method, for example, remote storage, removable media, local storage.

In an exemplary embodiment of the invention, a user or system can execute a bootstrapper to perform one or more of the installing part of the application to a particular destinations and/or bind components to point each other thereby possibly creating a working application.

In an exemplary embodiment of the invention, separation, bootstrapping, binding and/or installation are different for different uses:

In an exemplary embodiment of the invention, to create a portable application, the application components are divided into several sets:

(a) Installable components
(b) Isolable components
(c) Plugable components

In an exemplary embodiment of the invention, plugable and isolable components are installed on removable storage once. Installable components are installed on PC each time by a bootstrapper. Optionally, the bootstrapper is operated by a user or by a system (e.g., auto exec file) each time removable storage attached to computer.

In an exemplary embodiment of the invention, to create a copyright protected installation with a token, the components are divided into a set including one or more necessary executables and the other components. The necessary executables are installed on a portable storage with a hidden area accessible by a security key. The other components are provided freely. In use, a user receives a security code, for example, by e-mail a bootstrapper uses the security key (or a processed version thereof) to access the files in the secure area and mount the files in a correct installation location for the whole application to work.

Optionally, different application functionalities are provided by binding to different files, optionally using different keys. In an exemplary embodiment of the invention, the application is not modified by the manufacturer or specifically manufactured/designed to take advantage of the methods described herein. Rather, the methods may be applied on an existing application.

In an example of security usage, a portable memory with U3 support can be used to run executables from a hidden partition on the portable storage. Optionally, most of the applications components are preinstalled on the target computer while application binaries are on U3 hidden non-accessible partitions. The application can be launching only by plugging in a U3 portable storage with suitable executable.

In an exemplary embodiment of the invention, components and/or elements are divided up according to access speed, optionally to provide speed optimization. For example, components accessed often may be stored on a portable flash memory device, while large components are optionally stored on a hard disk and/or optical memory or otherwise slower memory.

In an exemplary embodiment of the invention, during installation, a speed of various storage device is calculated and components copied according to speeds. For example, a software like Microsoft Office is installed so main features are on a fast disk and less important features are on a slower disk.

Optionally or alternatively, components may be divided up taking into consideration storage capacity, for example, to evenly use up memory and/or percentage of free space amount a plurality of storage locations.

Optionally or alternatively, component dividing takes into account reliability and/or power consumption. Optionally, a user can provide input as to what optimization is preferred.

In an exemplary embodiment of the invention, the bootstrapper searches for and binds appropriate components using the following method: Bootstrapper observes available application maps and for each unresolved component search all available and/or predefined medias for compatible components. Then bootstrapper updates values of pointers to point to found component. Optionally, the bootstrapper only binds compatible components of portable applications if the rest of the application is already installed on PC.

Optionally, the bootstrapper does not install application components if it finds a compatible component already installed on a PC. Optionally, the bootstrapper changes a binding of an installed native component to be part of a portable application. The binding is optionally recovered when the portable application is removed.

Component Combiner

In an exemplary embodiment of the invention, components and/or elements are aggregated into new components, meta components and/or features. In an exemplary embodiment of the invention, such an aggregate is named using a unique ID (which is generated) ad optionally a text name that reflects a connection between the components, for example, a shared directory.

Optionally, a user selects which components to aggregate.

In an exemplary embodiment of the invention, a plurality of components (e.g., settings) are combined so as to speed up installation. In an exemplary embodiment of the invention, the components are combined into a meta component of a preinstalled user profile, which is optionally installed by mounting, rather than copying.

In an exemplary embodiment of the invention, a pre-built application file hierarchy is created to be a single component, which can also be installed rapidly by mounting.

In an exemplary embodiment of the invention, component aggregation is performed as follows:

(a) Set aggregation rules for elements and components that need to be part of new component or feature;

(b) Search for elements an components that are match these; and/or (c) Create one or more new components from found elements and components. Optionally, this includes creating a CIM complaint component: unique ID, name, etc.

In an exemplary embodiment of the invention, one or more of the following rules are used to decide on element/component aggregation:

1. Previously defined components and elements that go with the components are used to suggest which elements should go together.

2. Previously defined components and elements that are typically used in mobilization and/or other application modifications are used to suggest which components should be grouped (e.g., into an application hierarchy and/or settings folder).

3. Elements and components that have the same installation work flow, e.g., dll and registry elements that correspond to coin object are created using one API, suggesting that the two elements are part of one component that is com object component.

4. Elements and components that have the same or similar attributes, such as one or more (for example, 2, 3, 4, 5) of location, creation date, language, version, type, property, for example, all elements and components that can be registered in a HCU tree (e.g., a user profile) are decided to be part of one big mobilized component created by combining user profile and those components (corn objects, file extension).

5. Registry Elements and File elements that are related are aggregated into one component (e.g., depending on type of file). For example, a True type font registry element is aggregated with a file element which is of font type.

Similar consideration may be applied when combining components into features: installation workflow (same script section, customized using same UI), dependencies between components and/or components with same or similar attributes.

In an exemplary embodiment of the invention, a name of the new feature is selected to be a name of a script section shared by components, directory location, UI title and/or a combination of the above, optionally with a name identifying the object as a feature and/or a unique random ID.

In an exemplary embodiment of the invention, the following method is used to identify commonly installed components in a script, as being installed all by an independent section of a script. In an exemplary embodiment of the invention, an independent section is one with one or more of (may affect confidence levels) different variables, different elements being processed and/or different conditions. In an exemplary embodiment of the invention, the following method is used. First it is detected that a section is started. Then that a component is being processed and/or that a condition is being tested. Then the elements processed after are assumed to be suitable for aggregation until a new condition is applied and/or new section of script reached.

Isolator

Referring in more detail to isolator 412, in some embodiments of the invention, when an application is determined to use a public software shared by other applications, isolator 412 generates a copy of the public software and packages it with the application, so that it can be ported. Other types of isolation may be practiced as well, for example, moving an application to a CD-ram or other portable device, so that most of the application remains on the portable memory when being executed, moving an application within a file system, renaming an application and/or changing a user under which it is registered.

In an exemplary embodiment of the invention, a first step of isolation is identifying components which cannot be isolated and need to be duplicated, for example, fonts, users of registry from computer profile, drivers. In the Windows Vista operating system, a profile of a computer may be taken and more components became pluggable and can be isolated inside a computer profile (e.g., fonts). In one example, if an application places components in a system folder such as system 32, such components are moved elsewhere.

In an exemplary embodiment of the invention, the components are moved to where other components (e.g., executables) are placed. Optionally or alternatively, the components are moved according to where an operating system component loader looks, for example, according to pre-defined polices and/or values of system variables. For example, a system variable, such as PATH, is optionally edited to point to a desired location. In another example, a DLL is placed in a same folder as an executable that uses it.

In an exemplary embodiment of the invention, isolator 412 changes the names of the components of the application to be isolated to a unique name which is not shared by other applications. For example, pointers for all components are changed to point to a new ID.

In an exemplary embodiment of the invention, isolating includes changes the ID of one or more of product, feature user and/or component. In an exemplary embodiment of the invention, a new ID is generated using GUID tools. Optionally, this allows a same component to be re-registered under a different ID on a same PC. Optionally, as the other components of the installed application link to the new ID, they will use the new component. Optionally, the change sin pointers are made before installation. Optionally, changes (on the portable drive, if any) are undone after removal and/or before a next installation (e.g., if removal of a portable drives stops all power to drive and thus ability to undo changes).

In an exemplary embodiment of the invention, isolation includes detecting and changing private directories. Typically (and in some embodiments of the invention by design, as described herein), applications have root directory under which the application file hierarchy is built. Some applications have several roots, and spread files under some other directories, (like system 32 under windows). In an exemplary embodiment of the invention, a single root hierarchy is built for such an application by moving directors under a same root, and changing component pointers, installation flow and system variables accordingly.

In an exemplary embodiment of the invention, isolation includes canceling the use of paths and moving the files (components) to a hierarchy that is easier to manage (e.g., by being in a single and separate folder hierarchy).

In a particular example, a com object is moved to a private (application specific) location with the executable and then reregistered.

In an exemplary embodiment of the invention, when moving objects their "path" is changed form an absolute path to a path relative to the application. This can make installation/deinstallation simpler because most of the components/elements are in a single directory hierarchy. As noted herein, in some cases, this directory is off the main storage. In an exemplary embodiment of the invention, for installing such an isolated or mobilized application, what is required is setting various registry keys and/or updating and/or creating system variables.

In an exemplary embodiment of the invention, when isolating, an application registered to all users is reregistered to a single user (or all users on a one by one basis).

In an exemplary embodiment of the invention, when an application is installed on a temporary basis and/or on a permanent basis, a new user profile is created and the application installed under that profile. Optionally, various properties of the operating system, such as language support are changes for that dummy user. In an exemplary embodiment of the invention, the changes are applied by using a standard API to configure languages and/or install additional components. Optionally, the user environment is launched using an operating system API and changes are made inside the environment. In an exemplary embodiment of the invention, the user is added programmatically and then a "runas" functionality is used to run the user and use the install per user functionalities to install necessary components, for example, language patches, ".net" and/or java environment.

In an exemplary embodiment of the invention, once isolated, an application or parts thereof may be protected, for example, using encryption, or requiring a key to operate, for example, by applying NTFS encryption to the single directory(s) used by the installation, or by other methods of access limitations known in the art.

In an exemplary embodiment of the invention, the application is maintained by comparing the isolated state of the application when installed (or in a template) to its condition after a time, with any differences optionally repaired.

In an exemplary embodiment of the invention, portabilization involves making an application faster to install and able to execute off a portable memory device. Optionally, the components are sorted and combined into a small number of directories that can be quickly mounted. Optionally or alternatively, a bootstrapper program is added and/or a cleanup program added. Optionally or alternatively, component names are changed (before installation and/or during installation) to be unique and not clash with target system names. Additional isolation techniques which may be used include adding a manifest file that replace previous registration and/or renaming a dll to be dll.local.

Package Analyzer, Builder and Generator

In an exemplary embodiment of the invention, application mapping includes analyzing an installation together with package information such as a cache or uninstall data. Optionally or alternatively, extracting an installation comprises generating a new installation package which may be modified, in process and/or content from the one used for installation.

In an exemplary embodiment of the invention, a package is a combination of scripts and components and a table or rules which indicate which scripts to apply to which components. In an exemplary embodiment of the invention, tool 400 identifies the components and relationships between them. Optionally, the analyzed package is CIM compliant. However, for some embodiments, it is not. In an exemplary embodiment of the invention, a non-CIM package is analyzed and a new, CIM compliant package generated therefrom.

Referring in detail to package analyzer 422, in some embodiments of the invention, package analyzer 422 is adapted to handle a plurality of different types of installation software packages. In some embodiments of the invention, package analyzer 422 is adapted to analyze scripts and determine the specific installation tasks performed by the script. Alternatively or additionally, package analyzer 432 is adapted to analyze installation tables and determine from them the acts that are to be performed. Optionally, such tables and scripts are compared to an actual installation to extract values used by the scripts and/or tables.

Optionally, package analyzer 432 determines the order in which the installation acts are performed and notes the order in the internal structure. Optionally, the order of the installation acts are used in determining dependencies between components.

In an exemplary embodiment of the invention, a package is selectively installed and its execution (of install or of application) tracked to detect links between components, which are provided to builder 402. Alternatively or additionally, a recycle bin is analyzed to detect deleted components.

In some embodiments of the invention, package analyzer 422 executes the application a plurality of times, with different inputs.

In an exemplary embodiment of the invention, the package is repackaged/modified to include new policies, for example, a word processing package can include a directive to uninstall a previous package. Similarly, policies can be set up for absent/existed software, PC performance, PC hardware, age of user.

Exemplary Methods of Use

Figure 5A:
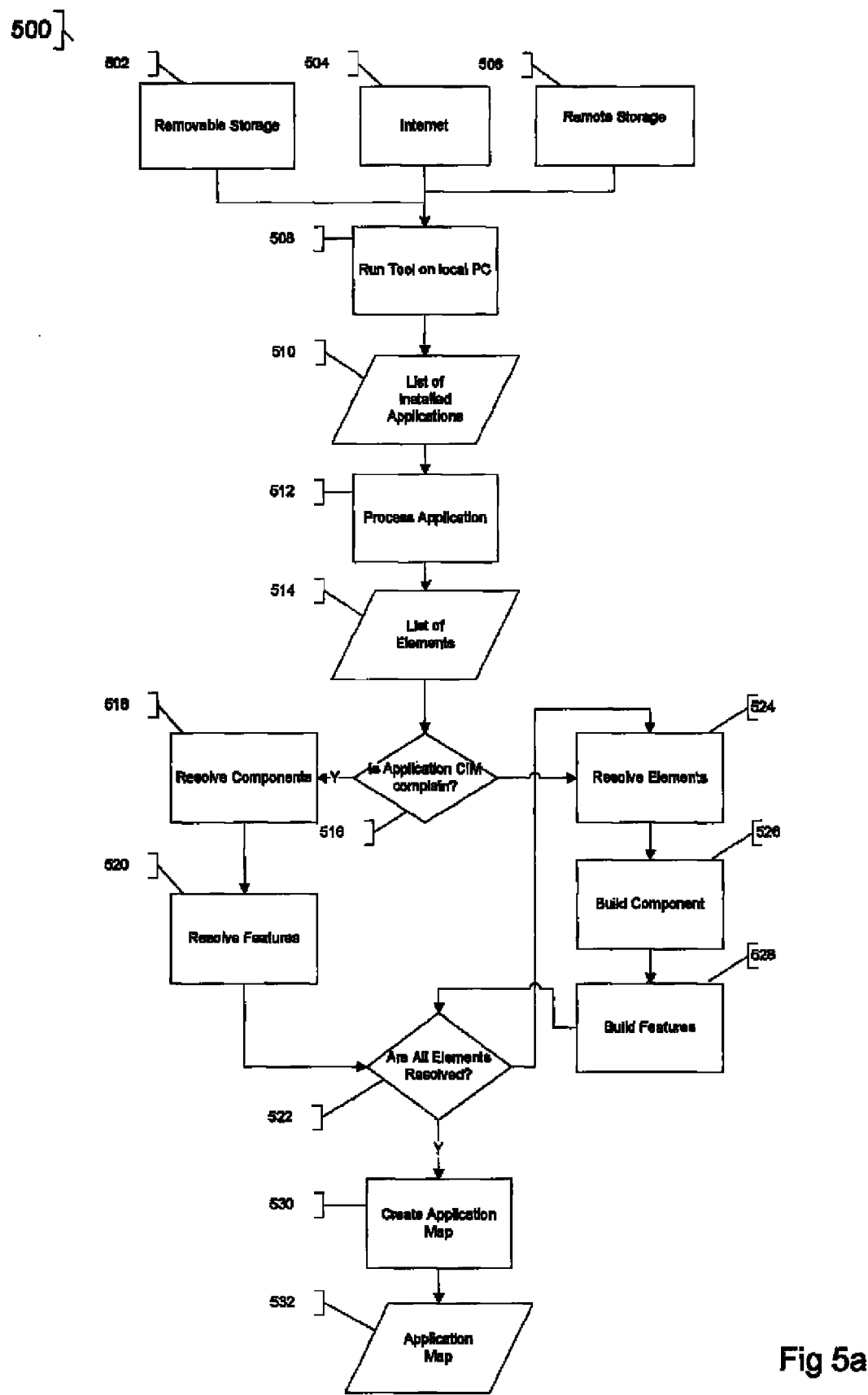
FIGS. 5A-5D are flowcharts of methods of using a software, in accordance with some exemplary embodiments of the invention.
Figure 5B:
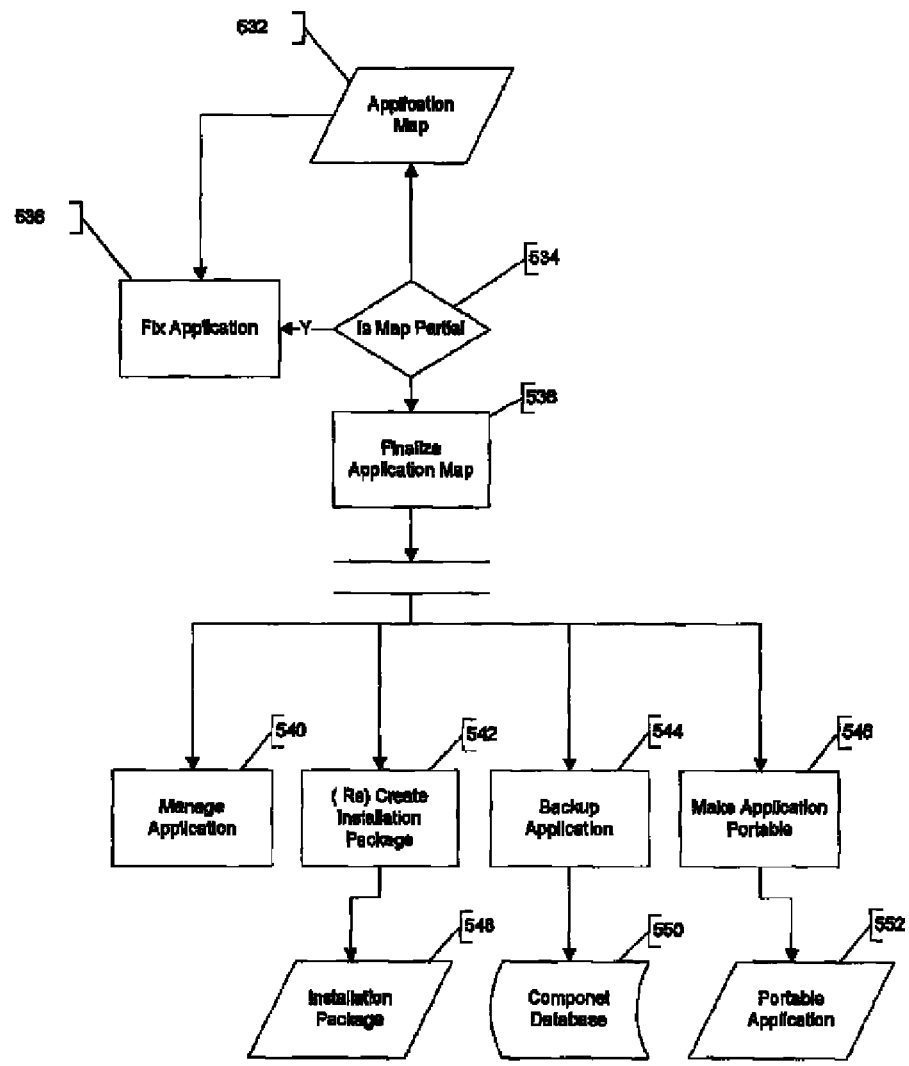

FIGS. 5A and 5B illustrate a method 500 of forming an application map in accordance with an exemplary embodiment of the invention. The following description generally builds on the various embodiments and features described above.

First, an application is installed on a target computer; then the method of FIG. 5A is applied. In some embodiments, the installation is directly to portable storage. Optionally or alternatively, the installation is tracked on the fly. FIG. 5A shows the case where a pre-installed system (e.g., PC) is provided. Optionally, the system is cleaned up or stabilized before installation. Optionally or alternatively, questions and answers during the installation are monitored by a monitoring program.

The transferor tool is provided, for example, on a removable storage (502), network such as the internet (504) and/or remote storage (506). Optionally, a portability server is provided on which transferring and mapping software is stored. Optionally or alternatively, such a server stores templates, tracks usage of the software, tracks movements of applications, provides backup, is used for problem solving, manages licenses and/or manages installations (e.g., stores installation maps) for a plurality of target computers At 508, the tool is executed on a local PC.

At 510, a list of locally installed applications (and optionally application parts) is generated.

At 512, a particular application is selected for extraction and processed.

At 514, a list of elements and/or components relating to the application are determined, as follows.

At 516, it is determined if the application installation is CIM (or other suitable standard) compliant. If yes, the components thereof are resolved (518) and features thereof are resolved (520). At 522, it is determined if all the elements are resolved, noting that the existence of additional elements may be generated by the resolving.

If not all elements are resolved, or if the application is not CIM compliant, the elements are resolved (524), components are built (526) and features are built (528).

If all elements are now resolved (522), an application map 530 is created. If not, the process is repeated. It is noted that the resolution process, while applying informers and deductions, can indicate the existence of new elements to be considered.

Referring to FIG. 5B, if the map is partial (534), the application is optionally fixed (536).

At 538, the application map is finalized, for example, stored (e.g., locally or remotely) and/or otherwise used.

After a time, or at once, the application map is used for various uses, for example, managing an application installation (540), e.g., adding or removing components or features; (re)creating (542) an installation package (548), e.g., extracting the components and elements into a single package; backing up the application (544), e.g., using a component database 550 which lists all the components and/or saves copies thereof; and/or make the application portable (546) creating a portable application 552, which may be, for example, remotely stored and/or moved to the portable storage device.

In an exemplary embodiment of the invention, the installation is modified or a new package generated, for example, changing an application map (e.g., modifying components, features, associations); changing an installation flow (e.g., adding new components, remove installation of features, components); modifying an installation flow description (e.g., NSIS script vs. MSI tables); modify an engine which executes the installation flow, (e.g., MSI engine, NSIS interpreter); and/or modifying an archive for installation package (e.g., NSIS package to ZIP, CAB, MSI package).

Figure 5C:
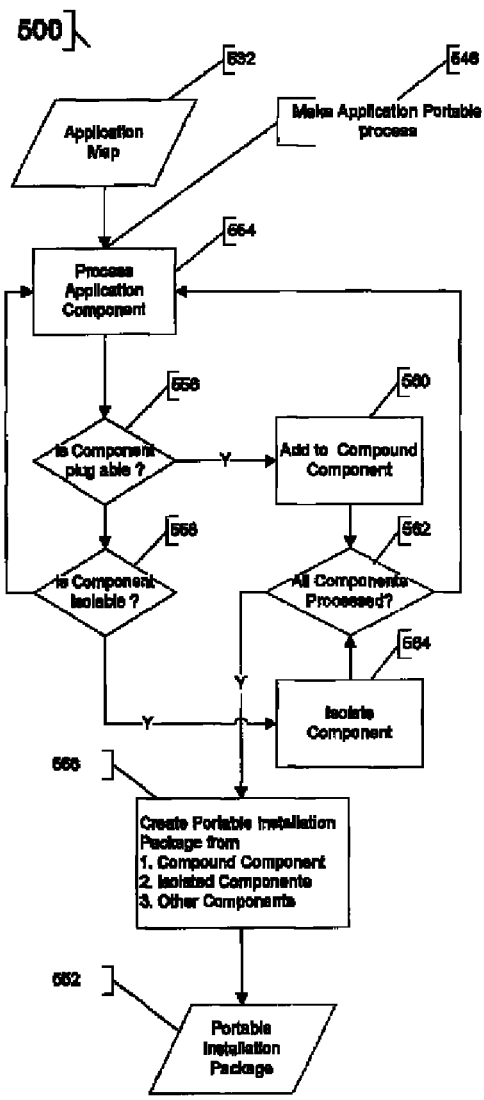

Referring to FIG. 5C, an application is made mobile. At 554, application components are processed (based on map 532). If the component is plugable (556) it is added to a compound component (560) until all components processed (562). If the component is isolatable (558) the component is isolated.

At 566, a portable installation package 552 is created, including: a compound component, isolated components and other components.

Figure 5D:
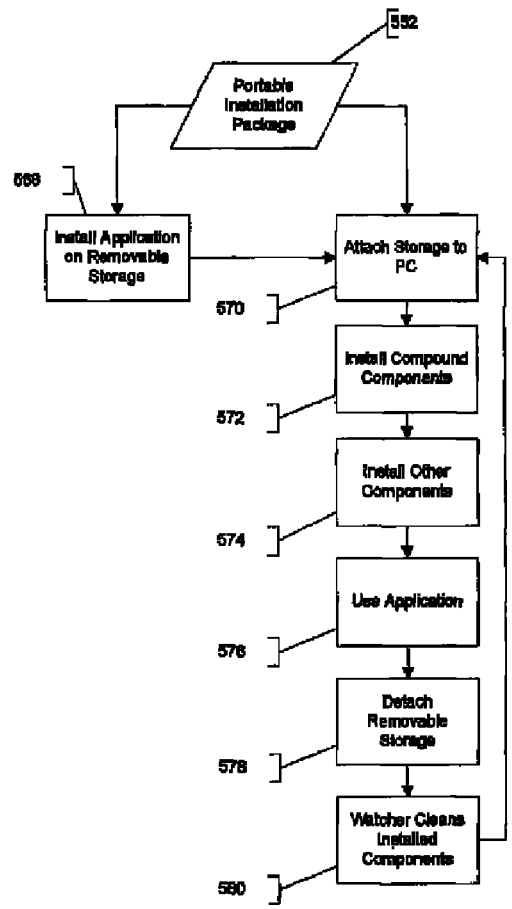

Referring to FIG. 5D, a portable installation package 566 is used. At 568, the application is installed on a removable storage medium. At 570, the storage medium is attached to a computer. At 572, the compound component is installed. At 574, other components are installed (at any order with 572). Optionally, the pluggable components are mounted-installed with the compound component. At 576, the application is used. At 578, the removable storage medium is detected. At 580, an optional watcher program cleans up mounting points and/or copied components/elements and/or itself.

Back-Up

In an exemplary embodiment of the invention, tool 400 is used for back-up purposes. In an exemplary embodiment of the invention, the backup is of a specific application or set of applications.

In an exemplary embodiment of the invention, such a backup allows a computer to be recreated after a fatal system crash, even if the new computer has a slightly different operating system and/or hardware.

In an exemplary embodiment of the invention, the backup, when applied to multiple computers stores a single image of an installation and then the modifications (e.g., registry entries) for each specific installation and/or features that a were added.

In an exemplary embodiment of the invention, no image is stored, rather what is stored is changes from standard installation and/or user settings.

Optionally, an isolation method as described above is used to support simpler back-up using standard tools In an exemplary embodiment of the invention, a backup is provided using a repository of components, noting that many components are fixed across installations.

In an exemplary embodiment of the invention, a backup client can submit a map and/or one or more components to be backed up. Optionally, the map is provided by the repository or other server and is used to indicate which components are customizable and need to be backed up, for example, settings. Optionally, the map includes all the features necessary for a working backup. Optionally, the map and/or components are stored in association with a client account.

During a restore operation, components and/or elements are retrieved, as needed form user account and/or from a shared account of common components.

In an exemplary embodiment of the invention, it is expected that such a backup provides a saving of at least 70%, 80%, 90%, 95%, 98%, 99%, 99.7% or better of the space needed for storing compressed versions of application installation images for 1000 applications.

Extract MSI Applications

In some embodiments of the invention, 400 is used to convert non-standard installations to standard (e.g., MSI-compliant) installations, by first extracting MSI application data and then creating an MSI compliant package using the information. In an exemplary embodiment of the invention, the following informers/sub-informers are used:

1. Installed application Informer
2. MSI cache Informer
3. MSI Internals Informer
4. Run Time Execution Dependency Informer In an exemplary embodiment of the invention, the following exemplary method is applied.

Exemplary Algorithm to Process MSI Applications

1. Run Installed Application Informer to create list of MSI Applications including application general information.
2. For each working MSI application
3. Create application map using MSI cache Informer
   1. for each custom Action use Run Time Execution Dependency Informer to list all additional dependences that are not inside map. Add to application map
   2. create a list of patches and transforms using MSI Internals Informers
4. Package all found data inside MSI installation package using MSI API
5. Create post installation scripts that will apply patches and transforms 6. Create post installation script that will recreate MSI entries Exemplary Installed Applications on Windows XP Informer An Installed Application Informer retrieves general information about applications installed per user or land on whole PC (e.g., Installation Engine, Title, Vendor, Version, Language, GUID, Main directory, Application State—{broken, working}, path to uninstall executable and/or Per User or Per PC installation)

In an exemplary embodiment of the invention, the informer carries out one or more, optionally all of the following activities:

Retrieve general information about MSI Installed applications Using MSI API. Most required information can generally be retrieved using API.

Retrieve general information about MSI Installed Applications by Observing MSI internal Entries under HKCR\Installer\Products\. For all Retrieved Applications there 1. if Application GUIDs was not retrieved via MST API assume that Application is in "broken" state 2. For all "broken" Applications Retrieve information using MSI Internals Informer Retrieve general information about non-MST Applications Observing entries HKLM and HCU under \SOFTWARE\Microsoft\Windows\CurrentVersion\Uninstall and skipping applications retrieved during previous steps.

Retrieve general information about other Applications by looking on Folders Names under % ProgramFiles %" and skipping applications retrieved during previous steps.

MSI Cache Informer

In an exemplary embodiment of the invention, this informer retrieves an application map for Software Application represented by GUID, optionally using the following method, some of which steps are optional and may be skipped.

1. Find a path to MSI cache of GUID Software Application
2. Open MSI Source package
3. Retrieve properties from source package and resolve them by executing actions from execution sequence until CostFinalize to ensure that MSI resolves all MSI run-time properties.
4. Retrieve directories from source package and resolve them using Installer.ComponentPath and/or MSI run-time properties
5. Retrieve all features from source package. For each feature:
   Verify whether feature should be processed
      Verifying Feature Level (Feature table has "level" field. Feature will not be deployed if value in this column is less then value of the "InstallLevel" property)
      Verifying Feature Conditions (Condition table changes feature level to the specified in the "level" column if value in "condition" column is evaluated to the true)
   Retrieve feature components.
   For each component:
      Verify whether component should be processed checking Component Conditions
      Retrieve Component type, attributes and conditions
   For each component type:
      Resolve assembly details by examining Assembly Tables
      Resolve File entries by examining Files Tables
      Resolve Registry by examining Registry Tables
      Resolve RemoveRegistry entries by examining Registry Tables
      Resolve Ini entries by examining Ini Tables
      Resolve RemoveIni entries by examining Ini Tables
      Resolve Environment by examining Environment Tables
      Resolve Com by examining Self Registered Tables
      Resolve Com plus by examining COM++Tables
      Resolve Published components by examining Published components Tables
      Resolve ODBC entry by examining ODBCDriver, ODBCDataSource and/or ODBCTranslator Tables
      Resolve Services by examining ServiceInstall and/or ServiceControl Tables
      Resolve Shortcuts by examining Shortcuts Tables
      Resolve Isolated components by examining Isolated-Component Tables
6. Retrieve common settings not related to the feature/component
7. Retrieve Custom Actions.
8. Resolve physical (file, registry) presentation for data using resolved run time parameters and component information
9. Build a map of all found data.

MSI Internals Informer

This informer obtains information from the MSI system, optionally, by carrying out one or more of the following:

Retrieving General Information about Software Application represented by GUID by examining corresponding registry keys and their values.

Retrieving Application map {components, relationships} for Software Application represented by GUID by examining corresponding registry keys and values Retrieving Patched (Updates) and/or Transformations for Software Application represented by GUID by examining looking on corresponding registry keys and values.

Run Time Execution Dependency Informer

In an exemplary embodiment of the invention, a Run Time Execution Dependency Informer retrieves some or all modules that are required for successful running of application executable. There are many different ways to build dependences. In an exemplary embodiment of the invention, the following method is used and which is generally suitable for windows base systems:

1. Receive path to execution, command line and working folder
2. Start executable inside separate Desktop.
3. Wait timeout (<2 seconds for simple applications)
4. Make a snapshot using CreateToolhelp32Snapshot functions
5. Enumerate modules
6. Save those modules in data base.
7. Acquire consequence snapshots and module enumeration every 100xn millisecond, where "n" is increased exponentially if no new module is found. If new module is found sent n=1. Other time delays may be used as well.
8. Optionally, snapshots are stopped if MAX(Global time out, WaitForInputIdle) returns+2 seconds.
9. Filter Modules that are well known modules (for example those listed under HKLM\System\CurrentControlSet\Control\Session Manager\KnownDLLs)
10. Create a list of execution dependences from modules that are left, for example, return a list of modules that were not filtered in a previous step, as execution dependences.

Exemplary Mobile Desktop/Personalized Environment Application

In an exemplary embodiment of the invention, this application provides a portable user desktop on a portable memory device, such that when the device is plugged into a windows-based system, the user desktop form the portable device is used as the system desktop.

Optionally, a complete personal computational environment is provided in mobile form. Such an environment may include one or more of: customized OS modules, applications, application Settings, operating system configuration files, personal data (e.g., passwords, cookie, favorites), documents and/or Media files.

In Microsoft windows operating systems the Personal Computational Environment is typically represented by a Windows Desktop Application.

To transfer a Personal Computational Environment from one PC to another generally means to extract an environment from the operating system of one PC and to plug it on a compatible operating system of another PC. In an exemplary embodiment of the invention, mobilization is provided, in which a Personal Computational Environment can be plugged and unplugged from any PC, preserving state, substantially instantaneously.

Extracting and Mobilization Operating System (OS) Components

Extracting optionally includes one or more of the following steps, optionally all:

1. Identify files and directory realizing OS module.
2. Identify pointers (e.g., registry and configuration files) pointing to those files and directories.
3. Create a copy of those files and directories, optionally preserving hierarchy.
4. Generate a script that can update pointers according to a file system on other PC. Optionally, each pointer has a meta tag which is instantiated to a particular path under a different file system on another PC, and a script runs over the list of pointers and replaces meta tags with resolved values.
5. Generate a script that organizes security and permissions, optionally by replacing meta-tags with resolved values that are available for a real computer only.
6. Copy all components and/or elements onto removable or remote storage, optionally preserving hierarchy Mobilization of OS components is optionally based on the ability of an OS to recognize removable storage and to extend a PC file system with the files presented on storage, by mounting. Some storage devices can be mounted by the operating system, and others, like some mobile telephones connected by Bluetooth, may use a helper application to cause them to appear as part of a file system. One or more, optionally all of the following steps are followed:

Plug Remote or Removable Storage

1. Mount the most highest directory that contains files and directory realizing OS modules to a particular place inside file system on the target computer. Run script that changes registry to point to the storage
2. Run script that manages security and permissions An Example A Windows User profile comprises files and directories under the name of a user. All user settings and configurations are storage in a registry hive stored in the file ntuser.dat. In an exemplary embodiment of the invention, a copy of those files and directories is created on removable storage. After plugging-in of the removable storage a directory of the storage is mounted under "document and settings" directory. A new user is added to the target operating system and is pointed to this profile. This process typically transfers and mobilize most of the components of a Personal Computational Environment on Windows OS.

Mobilized Applications

Mobilized applications are applications which are prepared for moving around. Optionally, the components of such applications are partitioned into two or more of four parts, for example as follows.

Isolable Components:

Those components that can be used without installation. Examples of such components are general propose files, static dll, Assembly and COM objects.

Plugable Components:

Those components that can be placed inside mobilized OS modules or inside other components in such a way that integration or installation of those modules inside an OS causes installation of those components. Examples of such components are some COM objects, some of which are optionally treated as pulggable or isolatable as desired, file extensions, Registry under HCRU, where a mobilized OS module is user profile that may hold registry and COM object registration records. An example of a component that may contain other plugable components is a directory that is mounted under some path thus causing all files under this directory to be installed under particular path.

Installable Components:

those components that need to installed on each PC to be useable. Some of installable components need to be recreated from scratch on the each PC, for example HKLM registry keys. Others, like FONT component, required registration in OS before their usage and are optionally installed using a regular component installation procedure.

Servicing Components:

Servicing components are helper components added to the original application and used to smoothly integrate mobilized application on PC and are provided in accordance with exemplary embodiments of the invention, such as a bootstrapper, watcher and/or remover.

In an exemplary embodiment of the invention, applications are mobilized by partitioning them into the above components using the Application Reassambler (Application Grabber) and integration of them on any PC according to component type.

In some embodiments of the invention, integration of mobilized applications on a new PC, is assisted by dealing with one or more of the following issues.

1. Conflict Resolution: Typically, the only components which required conflict resolution are Installable components. Usually the OS solves conflicts for pluggable components, or they are solved by renaming, for example, as described above. Isolable components do not conflict with similar components in OS. Service components have no conflicts due to uniqueness.
2. Preserve Application State: This means preserving changes in settings of an application from run to run even on different computers. If changes are performed on application components there is typically no problem since those components are transported from PC to PC together with application. Some Installable components are recreated each time from the beginning.
3. Creation of New/Deletion of components: During run time applications may create or acquire new components due to update or changes in feature- or component-set. Some other components may be marked as deleted.

Mobilizing Applications and Personal Computational Environment.

To Mobilize Applications and a Personal Computation Environment they are put on a removable or remote storage. After a storage is attached to a new PC to complete integration one or more of the following steps are optionally performed:

Decide under which modes to operate
1. Only Mobile Applications
2. Only Personal Computational Environment (without Applications)
3. Both Integrate/install/mount mobilized. OS modules inside OS.
Switch to Personal Computational Environment if chosen.
Perform conflict resolution for components.
Install Installable components,
Install Service components, if needed
Work with application(s) and/or Personal Computational Environment
Periodically Preserve Application(s) Environment States
Periodically Learn and Add newly Created components
Periodically Learn and suspend deleted components. Optionally, the learning is by monitoring user environment and comparing changes and/or by detecting events caused by actions (such as add or delete component)
Uninstall installable components.
Unplug OS modules and/or Restore OS modules
Clean Application(s) and Environment leftovers In an exemplary embodiment of the invention, these operations are divided between following software agents:

Booter: install and run Watcher if not exist on OC, UI, helps to chose between modes.
Watcher: Recognize mobilization-enabled device, Recognize device detaching, start Booter, perform most of above operations.
Starter: Prepare Mobile Application execution, runs execution: works as an application shell Prepare Mobilize Flash Desktop 1. Prepare Mobilized Applications—Use Application Reassembler—Grabber on Removable or Remote storage
2. Put Booter, Watcher, Starter on removalbe or remotes storage
3. Mobilize OS modules
4. Run Mobilized Personal Computational Environment
5. For each mobilized application
6. Install isolable components in appropriate places inside mobilized Personal Computational Environment file hierarchy
7. Install plugable components inside components and mobilized OS Modules.
8. Install service components according to their places.
9. Put installable components in their places Optionally, all installable and service components of all applications are combined into a single installation package to speed up their setup on a target PC Mobilize Flash Desktop Usage 1. Plug Removable or Remote storage on target PC
2. If PC has Watcher it will start Booter automatically otherwise run Booter from the storage, optionally using "autorun".
3. Chose one of the modes of work suggested by Booter, manually or automatically (e.g., based on stored settings)
4. Watcher performs necessary steps for installing Mobilized Applications and integration of Mobilized Personal Computational Environment inside OS of target PC
5. Use Applications and/or Personal Computational Environment
6. Detach storage.
7. Watcher performs all cleaning operations on that PC and optionally deletes itself. Optionally or alternatively, the watcher remains and is used for providing additional functionality, for example, autorun functionality or elevating administration privileges for future installations.

Exemplary Conflict Resolution

When a Mobilized Application is integrated into an OS of a target PC it may happen that some components conflict with existed components. This means that installing some conflict component will damage functionality of an existed application. However, if those components are not installed, a mobilized application may fail to operate properly with the existed components.

Two components may conflict, or example, if they have to be at the same place in file system or if OS creates the same registry records for those components. If the components have different content then they conflict. Typically only installable components of an application may conflict, as they are copied to a location which may include a corresponding component. Optionally, isolated components are not copied. In some cases, local components are used instead of installing.

Exemplary Conflict Resolution method

1. For each installable component
2. Decide if it may conflict with an existed component.
3. If it may conflict check if they have similar content (e.g., up to some invariants like compilation date)
4. If they have the same content, update dependences of other application components. This installable component will be not used, a local component will be used instead.
5. If they not in conflict create a patch procedure that will replace registry records of the local component by registry records of installable component.
   1. Install this patch over existed components.
   2. During cleaning procedures: Uninstall the patch to revert a state back to registry of local component.

Preserve Application State and Creation New Components

Changes in installable components and creation of new components are tracked by run time monitoring of the application. If changes are observed, a new content or new component are added to Mobilized application, for example, by a watcher process.

Exemplary Application Reassembler

Typically a software application constitutes well-defined logical and physical elementary components. Application setup instantiates those components during application installation. The component instantiation depends on user preferences and computer environment. Once completed, the customization is unavailable on another PC. A user must perform it again to achieve the same look&feel of applications on a (new) PC.

An application Reassembler, in accordance with an exemplary embodiment of the invention, learns application components, add-ons, conditional states and internal and external dependences of an application(s) installed on a windows desktop computer. The system uses the information to create a new installation package of an application. This installation package may be used to recreate the same fully functional configured and customized application(s) on another windows desktop computer. Alternatively and additional it may be used as backup solution for installed applications.

It should be noted that an original application setup may be different from reassemble package since it describes already instantiated components, which include user preferences and computer different environment (to some extent).

Exemplary Application Reassemble Description

A user may launch Application Reassemble from removable or remote storage, from web or from local drive on any computer.

Once launched Reassemble scans PC OS for installed applications and customized OS components. It acquires a general information about installed applications such as: Name, Version, Vendor, Size of Applications, main application directory, type of installation package and other information. This information will be used for further processing.

Application Reassemble optionally interacts with user or other applications via WEB UI, GUI, command line or dedicated API.

Such an interface optionally allows to do one or more of
observe scanned information
select to reassemble application(s) and/or OS components.
indicate a destination to which a reassembled installation package of each application is put: e.g., local disk, removable or remote storage or remote server.
reassemble applications or/and OS components periodically.

Optionally, Reassemble carries out the choice while working in background.

In an exemplary embodiment of the invention, the reassembled installation packages become available on a chosen destination via Reassemble interactive interfaces.

Optionally, the interfaces are accessed via third party interactive interfaces, e.g., file browsers, for example if installation packages are presented as self extracted files.

In an exemplary embodiment of the invention, a user can use the reassembled installation packages to do one or more of Transfer applications and settings, (and optionally data) to a new computer
Make a backup for applications and application settings (optionally including OS settings)
Fix application and application components.
Share applications, application settings or customized components with other users Exemplary Reassemble Modules In an exemplary embodiment of the invention, Reassemble has 6 Modules that perform those operations:

1. Task Manager—converts user's choice to the tasks to perform. Schedules those tasks.
2. Informers—software agents which necessary information about applications and OS components.
3. Strategy Runner—runs informers according to some particular strategy suited to solve typical problem. For example, if an application is CIM compatible, high level informers are executed first to resolve components and features, so that fewer components/elements remain unresolved for more complex decision making (e.g., confidence level determination of component association).
4. Components Data Base—aggregates information collected by informers.
5. Decision logic—analyze information collected by Informers.
6. Packager—package application components into an installation reassembled package.

In an exemplary embodiment of the invention, these modules communicate with each other to perform necessary tasks. They may run on separate PC as well, for example, using a client-server architecture.

Informers

Some Informers are able to gather information about particular type of application or OS components or components. Other Informers gather information about associations between those components.

Examples of Informers:

MSI Informer provides information about applications that are installed by MSI engine.

NSIS provides information about applications that are installed by NSIS engine.

File Informer provides information about files affected by an application.

Component Dependency Informer provides information about dependencies between application components.

Some informers include their own knowledge base. In an exemplary embodiment of the invention, an informer can depend on information from another informer, as an input, to be extended and/or to be verified.

In an exemplary embodiment of the invention, informers are layered according to data they provide. Informers consume data from a layer below and provide data for high level informers. In an exemplary embodiment of the invention, the following informer layers are defined, with each layer feeding off the previous layer:

(a) application properties informers;
(b) in parallel, element informers, including file systems element informers, registry element informers, environment element informers and ini file element informers;
(c) component informers
(d) feature informers; and
(e) product informers.

As noted above, some informers are basic, which merely extract data and some informers are smart, which deduce information, for example, from raw data of interaction points and/or lower level informers.

The following is a table illustrating various informers according to the above levels, with "basic" informers, marked with a "B".

| Product Informers |
| --- |
| NSIS—parse NSIS unisntaller to locate product components |
| MSI cache—parses MSI cache file to retrieve product components. "B" |
| MSI install package—parses MSI install package to retrieve product components. "B" |
| MSI internal—parses MSI internal structures to retrieve product components in case if internal cash is missed. Gather also details about applied patches. |
| WMI—gathers an information from WMI~to MSI cash informer. "B" |
| Feature Informers |
| Feature List—build features from available elements |
| Component Informers |
| COM—parses all com-related registry and file elements and locate all related entries that are missed in the application presentation. Groups all elements to the software element |
| ODBC—parses all ODBC related software elements to locate ODBC software elements. Populate missed elements. |
| Assembly—parse software elements to locate assembly elements |
| Drivers—parse software elements to locate driver elements |
| Shortcuts—parse software elements to locate shortcuts |
| Dependency—build dependency list for each code libraries and executables. Try to add missed elements and components. |
| File component—locate all files in the product that has not associated component. Create file component for them. |
| Registry component—locate all registry elements that has not associated component. Create registry component for them. |

| File-system Element informers | Registry level informers | Environment variables Element informers | Initialization file Element informers |
| --- | --- | --- | --- |
| File Informer—recursively parse application directories for missed directories and | Registry—parse registry to locate application registry settings. Registry From | Environment Variables—parse environment variables to locate used | IniFile—parses file elements to locate ini files |

| files Files From Registry— parse registry elements to locate referenced files. | Files—parse registry to locate keys and values that refer to application files Application properties informers | by product. |
|---|---|---|

Add/Remove Programs informer—parse information in the registry, about installed products. Resolves products name, install path, installer type, etc In an exemplary embodiment of the invention, each informer and/or data extracted by the informer and/or rule applied by the informer has a "confidence level". The confidence level of each informer can be used to resolve conflicts (e.g., by the software or by other informers, if several informers provide ambiguous details for same application object.

Decision Logic

Typically, information collected by Informers is not precise. It may contain erroneous references and omissions. By observing and analyzing information as a whole it is possible to recreate a more precise picture of application components and associations. A Decision Logics module refines collected information. It applies a set of heuristics using statistic, logic and/or other analytic tools to concretize application components and associations. The module may discover that some information is absent. It will operate some Informers again to acquire necessary information.

Strategy Runner

A sequence in which informers are applied in first time depends on goals (e.g., what type of reassembly will be carried out) and/or type of application (e.g., compliance with CIM, number of elements, user configurability). For example Informers may be operated according to one or more of the following goals.

Reassemble installed application
Backup installed Application
Reassemble installation package Particular strategies in which Informers are applied may increase system performance and/or completeness of the gathered information. In an exemplary embodiment of the invention; the strategy Runner identifies which strategy is used dependably on a type of task to perform.

Task Manager

Task manager manages workflow of tasks performed by Reassemble.

For example to operate Reassemble over several applications a particular sequential workflow can be applied by Task manager. For example, if some common component is already collected it is skipped, and only referenced in the installation package.

Another example is an application backup workflow managed by Task manager, one of the tasks of the workflow will be a periodical reassembling of application settings.

In an exemplary embodiment of the invention, one of the following four workflows is provided, according to the task to be performed:

1. Application Migration
2. Application Backup
3. Application Mobilization
4. Application Repair In an exemplary embodiment of the invention, a standard language, such as BPMN, XPDL, UML, is used for the description of the workflow and a standard execution engine such as BPEL or YAWL is used to execute the workflow.

Packager

Packager is a software agent that creates a reassemble installation package from application components and their association. It may create installation packages applying some modifications on set of application components.

For example, a package can be one or more of:

Clean reassemble package: Such a package will include a clean copy of application installation without user specific customization Isolated Components reassemble package: Creates an application installation in which components are more portable. Such installation packages will conflict less with existing applications.

Mobilizing Application: An application is separated on four types of components to allow mobilization of application.

Components Data Base

A component data base stores application components and associations per reassembling application. The database is accessed for various uses, as described above.

For some strategies this module may be of less use. For example while reassembling MSI type of applications an application package may be created on the fly from the components found by informers since no information backtracking is necessary.

A component database is optionally used in one or more of the following manners:

A Components Database may be preloaded with data on an already know application component.

If Reassemble works with or updates a central database, the usage on various target computers, each one differently configured, will act to accumulate information about many software components of more popular (possibly even less popular) applications.

Using a previous database as a starting point or as an ending point may shorten the process of collection and analyzing information about application components. It may also decrease an amount of data collected and sent by informers.

Exemplary Client-Server Application Reassemble

The modules described above can be assembled, in various embodiments of the invention, into one system using different network topologies and run on distributed computer systems.

In an exemplary Client-Server network topology, Interactive interfaces and Informers are run on local PC, while task manager and Strategy runner, and Components Database run on a centralized server. Packager may run on client or server.

A database servicing many Application Reassemblers is optionally preloaded with a large number of applications. Additional applications are automatically added by regular usage of Client-Server Application Reassemble on going base.

Informers running on a local PC collect necessary information and send it to server for further processing by Decision logic. Since server uses a central component data base which may be loaded by necessary application components, Strategy Runner and Decision logic can stop the retrieving of redundant information by informers and speed up the process and reduce amount of information send by Informers to server, if such information is already known. Ina typical SO/HO or medium size or enterprise setting, many of the application installed will be common and/or with similar features enabled.

A final reassemble installation package may be created by Packager locally or on central storage. Those installation packages may be downloaded from remote storage by user during actual usage.

Exemplary Application Reassemble Usage Scenarios

Some usage scenarios are described.

Use Case PC2PC

One of the use cases of Application Reassemble is for transferring applications and settings from an old PC to a new PC.

In an exemplary embodiment of the invention, this task is performed as follows:

1. Connect removable storage to old PC.
2. Run Application Reassemble.
3. Choose (all) Applications to grab.
4. Point as a destination the removable storage, (or other remote storage, or storage on new PC).
5. Create Reassemble installation packages for those applications, typically ~1 hour of work.
6. Go to a new PC.
7. Connect removable storage to new PC (or other remote storage, or storage on new PC).
8. Run Reassemble again (Alternatively run self extracted packages one after another).
9. Select all reassembled instillation packages.
10. Select "Install (All)".
11. Wait until all files will be copied.
12. Make sure that task PC2PC was completed.

In an exemplary embodiment of the invention, one or more of the following is copied as well:

1. User profile (e.g., desktop—shortcuts, wallpaper, folders look& feel)
2. PC profile (e.g., wireless settings)
3. Internet Explorer profile and settings (e.g., history, auto-compilation, favorites)
4. Outlook Express profile and settings
5. Settings for Build-in Microsoft Applications (e.g., Windows Media Player)
6. Applications settings. e.g. Outlook settings Use Case PCBACKUP One of the use cases of Application Reassemble usage is backup application and application settings on PC.

In an exemplary embodiment of the invention, this task is performed by:

1. Run Application Reassemble first time on computer
2. Choose (all) Applications to backup
3. Choose as a destination PC local storage (or remote storage, or removable device)
4. Choose Name schema for applications backup (e.g., application+date or application+run number)
5. Choose Cleaning schema for application backup (say 30 day old, last 30 and so on, optionally taking into account size)
6. Schedule job for periodical work
7. Close Reassemble In an exemplary embodiment of the invention, reassembler will run in background creating, for example, 1. an initial application package.
1 One or more patchs which holds difference between consequence runs.

Optionally, the following hierarchy serves as an example:
AppBACKUP
Outlook
Diff-Outlook12.31.07
Diff-Outlook12.31.07

In an exemplary embodiment of the invention, a user can restore a backup by:

1. Run Reassemble again
2. Choose a backup patch (s) to recreate
3. select "install"
4. Wait ~10 minutes to finish
5. Make sure that task application recreation completed Use Case APPSHARE—User2User One of the use cases of (Client-Server) Application Reassemble usage is application sharing.

In an exemplary embodiment of the invention, a First User acts as follows:

1. Run Application Reassemble on computer
2. Choose Application whose settings are to be Reassembled
3. Choose as a destination a remote storage
4. Define the destination as a public or semi public destination (at least for read access) (e.g., My Friends, all)
5. Reassemble Application settings to that destination In an exemplary embodiment of the invention, the other user acts as follows:

1. Run Reassembler on PC
2. See which public destinations are available on the server. As an example, the following may be visible
   MyAppShare of "XXXX" user Outlook English
   Excel—English
   ShareAPP of "YY YY" user
   OpenOffice—Hebrew spelling available
3. Among those choices mark the desired application settings to be used
4. Select "Install"
5. (Answer all warning messages)
6 Wait ~10 minutes to finish (or, as in other cases, use a progress bar or other time/process indicating method, such as an alert when done method)
7. Make sure that task application recreation was completed General It will be appreciated that the above-described apparatus and methods may be varied in many ways, while still implementing the ideas of some embodiments of the present invention. It should also be appreciated that the above described description of methods and apparatus are to be interpreted as including apparatus for carrying out the methods, and methods of using the apparatus.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well. Where a server is described, a distributed system may be provided with multiple computers co-located or not.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to".

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the components and limitations as used in the claims.

The invention claimed is:

1. A method of mapping a software installation, comprising:
    (a) providing a software installed on a computer with an operating system and at least one storage device, the installation including a plurality of software components and at least one entry in a system record on the storage device;
    (b) providing a plurality of potential interaction points between said installation and said computer;
    (c) executing at least one informer on said computer to obtain information about said potential interaction points of said installation with said operating system; and
    (d) determining a plurality of relationships between said components based on said interaction points on which information was obtained,
    wherein said at least one informer includes at least 3 informers selected from a group consisting of:
        (i) a file system informer which finds files that are at least one of affected by and used by the software;
        (ii) a registry informer which finds at least one of registry entries and registry values that are at least one of affected by and used by the software;
        (iii) a com object informer which finds and reconstructs objects that are of type com and which are at least one of affected by and used by the application;
        (iv) a CIM (Common Information Model) informer which retrieves CIM information;
        (v) a WMI (Windows Management Instrumentation) informer which retrieves WMS (Windows Management Services) information;
        (vi) an uninstall informer which retrieves uninstall information from locations where such data is stored;
        (vii) a system environment informer, which reports a system environment;
        (viii) a product informer, which identifies one or more of the software, system cache belonged to the software, main directories, vendor, version and language;
        (ix) a feature informer, which identifies which features of the software were installed;
        (x) an component informer, which identifies which components of the software were installed;
        (xi) a plug-in/add-on informer which identifies software packages with which the software could act as a plug-in or add-on;
        (xii) an install list informer, which identifies which software is installed on the computer;
        (xiii) a settings informer, which identifies system settings of the software; and
        (xiv) a calling dependency informer, which identifies which components call which other components of said installed software.

2. A method according to claim 1, comprising identifying at least one additional interaction point based on said determining.

3. A method according to claim 1, wherein said record includes one or more of:
    i) a system registry;
    ii) an application set up file of an application other than said software; and
    iii) a system set up file; and
    iv) information retrievable using a system API.

4. A method according to claim 1, wherein said components are installed in a plurality of directories of said storage device including at least one system directory and at non-system directory.

5. A method according to claim 1, wherein providing a plurality of interaction points comprises determining which of a plurality of potential interaction points are used, including at least one interaction point required by the operating system and at least one interaction point required by the software.

6. A method according to claim 5, wherein at least some of said plurality of potential interaction points are identified by analyzing one or more of an operating system cache, a trace, a log, and known application components.

7. A method according to claim 1, wherein determining a plurality of relationships comprises analyzing at least one value in a registry to determine a reference to another component or element.

8. A method according to claim 1, comprising aggregating a plurality of software components into a meta-component providing a functional feature, and recording said aggregated meta-component.

9. A method according to claim 1, comprising identifying interaction points based on (c) and (d) and repeating (c)-(d) based on said identified points.

10. A method according to claim 1, comprising profiling said software prior to said installing to determine at least part of said plurality of potential interaction points, by analyzing a specific installation different from the instant installation.

11. A method according to claim 1, comprising at least partially executing said software to identify at least some of said potential points.

12. A method according to claim 1, comprising:
    combining the information obtained by said at least one informer, to provide an installation map comprising a list of all software components of said installation, their locations and relationship between them.

13. A method according to claim 12, comprising preparing an installation file based on said map and configured for fast installation.

14. A method according to claim 12, comprising generating a portable version of said software using said map.

15. A method according to claim 12, comprising extracting settings of said software and using said settings for a different installation.

16. A method according to claim 12, comprising modifying or repairing said installation using said map.

17. A method according to claim 12, comprising managing said installation from a server, using said map.

* * * * *